United States Patent
Morozumi et al.

(10) Patent No.: US 10,665,855 B2
(45) Date of Patent: May 26, 2020

(54) ACTIVE MATERIAL, METHOD OF MANUFACTURING ACTIVE MATERIAL, ELECTRODE, AND SECONDARY BATTERY

(71) Applicant: Murata Manufacturing Co., Ltd., Kyoto (JP)

(72) Inventors: Takeshi Morozumi, Kanagawa (JP);
Keitaro Kitada, Kanagawa (JP);
Yoshihide Nagata, Tokyo (JP);
Takatoshi Munaoka, Kanagawa (JP);
Kenji Matsubara, Kanagawa (JP);
Yuko Ohtaniuchi, Kanagawa (JP);
Aiko Kanazawa, Kanagawa (JP);
Nobuyuki Nagaoka, Kanagawa (JP);
Masahiro Kikkawa, Kanagawa (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 537 days.

(21) Appl. No.: 14/432,187

(22) PCT Filed: Oct. 4, 2013

(86) PCT No.: PCT/JP2013/077117
§ 371 (c)(1),
(2) Date: Mar. 27, 2015

(87) PCT Pub. No.: WO2014/054792
PCT Pub. Date: Apr. 10, 2014

(65) Prior Publication Data
US 2015/0318542 A1    Nov. 5, 2015

(30) Foreign Application Priority Data

Oct. 5, 2012  (JP) .................... 2012-222774

(51) Int. Cl.
*H01M 4/26* (2006.01)
*H01M 4/04* (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
CPC ...... H01M 4/366; H01M 4/48; H01M 4/0404; H01M 10/0525; H01M 4/0471;
(Continued)

(56) References Cited

U.S. PATENT DOCUMENTS

2006/0134516 A1* 6/2006 Im .................... H01M 4/133
                                                              429/218.1
2007/0122712 A1* 5/2007 Kang ................ H01M 4/134
                                                              429/232
(Continued)

FOREIGN PATENT DOCUMENTS

JP  2000-173612 A   6/2000
JP  2001-068096 A   3/2001
(Continued)

OTHER PUBLICATIONS

Office Action for Japanese Patent Application No. 2014-539851, dated Oct. 3, 2017, 05 pages of Office Action and 4 pages of English Translation.

*Primary Examiner* — Lisa S Park
(74) *Attorney, Agent, or Firm* — Chip Law Group

(57) ABSTRACT

A secondary battery includes a cathode, an anode including an active material, and non-aqueous electrolytic solution. The active material includes a center portion and a covering portion provided on part or all of the center portion. The center portion includes silicon, tin, or both as constituent (Continued)

elements. The covering portion includes a plurality of fibrous carbon materials. Part or all of the fibrous carbon materials extend in a direction along a surface of the center portion and are closely attached to the center portion.

16 Claims, 13 Drawing Sheets

(51) Int. Cl.
*H01M 4/48* (2010.01)
*H01M 4/587* (2010.01)
*H01M 10/0525* (2010.01)
*H01M 4/36* (2006.01)
*H01M 4/38* (2006.01)
*H01M 4/134* (2010.01)
*H01M 4/133* (2010.01)
*H01M 4/02* (2006.01)
*H01M 10/0563* (2010.01)

(52) U.S. Cl.
CPC .......... *H01M 4/133* (2013.01); *H01M 4/134* (2013.01); *H01M 4/364* (2013.01); *H01M 4/387* (2013.01); *H01M 4/48* (2013.01); *H01M 4/587* (2013.01); *H01M 10/0525* (2013.01); *H01M 10/0563* (2013.01); *H01M 2004/021* (2013.01); *H01M 2004/027* (2013.01); *H01M 2220/10* (2013.01); *H01M 2220/20* (2013.01); *H01M 2220/30* (2013.01); *Y02T 10/7011* (2013.01)

(58) Field of Classification Search
CPC ...... H01M 4/134; H01M 4/387; H01M 4/133; H01M 4/364; H01M 4/587; H01M 2004/021; H01M 2220/20; H01M 2220/30; H01M 2220/10; H01M 2004/027; H01M 10/0563; Y02T 10/7011
See application file for complete search history.

(56) References Cited

U.S. PATENT DOCUMENTS

| 2008/0038635 A1* | 2/2008 | Sheem | H01M 4/04 429/212 |
|---|---|---|---|
| 2009/0023073 A1* | 1/2009 | Okada | H01M 2/145 429/246 |
| 2010/0092868 A1* | 4/2010 | Kim | B82Y 30/00 429/231.8 |
| 2013/0244106 A1* | 9/2013 | Chang | H01M 4/587 429/211 |

FOREIGN PATENT DOCUMENTS

| JP | 2003-303588 A | 10/2003 |
| JP | 2004-244309 A | 9/2004 |
| JP | 2006-100244 A | 4/2006 |
| JP | 2009-176721 A | 8/2009 |
| JP | 2009-272041 A | 11/2009 |
| JP | 2010-095797 A | 4/2010 |
| WO | 2012/086976 A2 | 6/2012 |

* cited by examiner

[ FIG. 1 ]
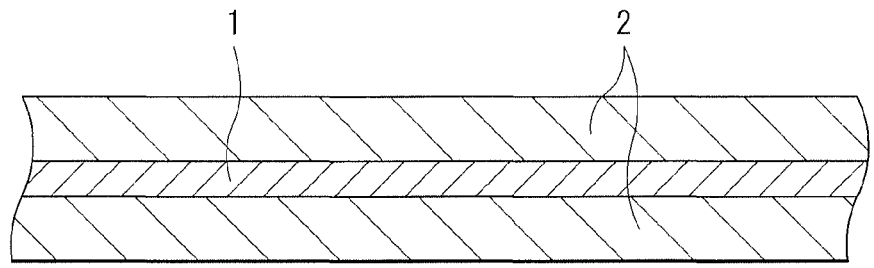
[ FIG. 2 ]
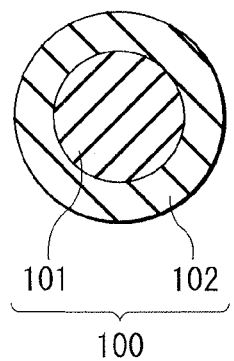
[ FIG. 3 ]
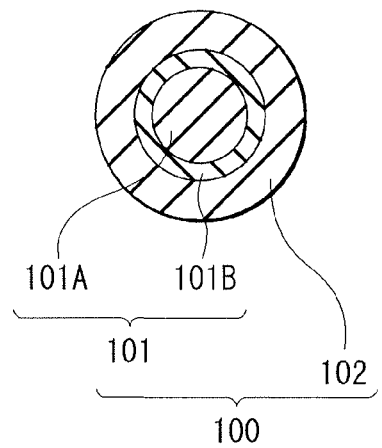

[ FIG. 4 ]
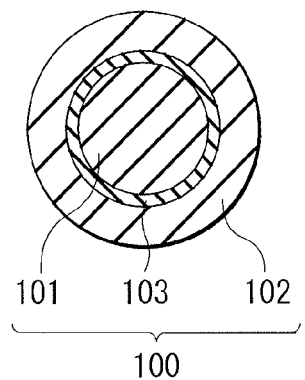

[ FIG. 5 ]
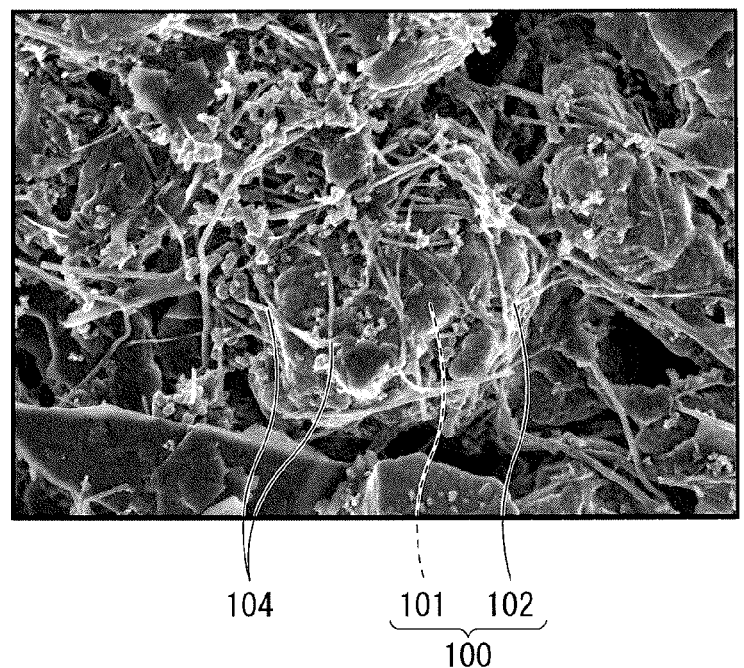
104　　101　102
　　　　　⎵
　　　　　100
[ FIG. 6 ]
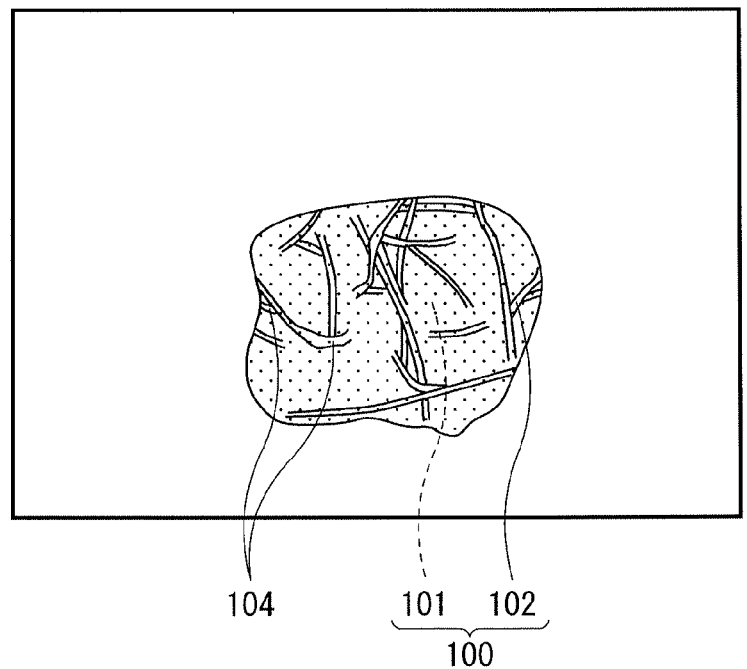
104　　101　102
　　　　　⎵
　　　　　100

[ FIG. 7 ]
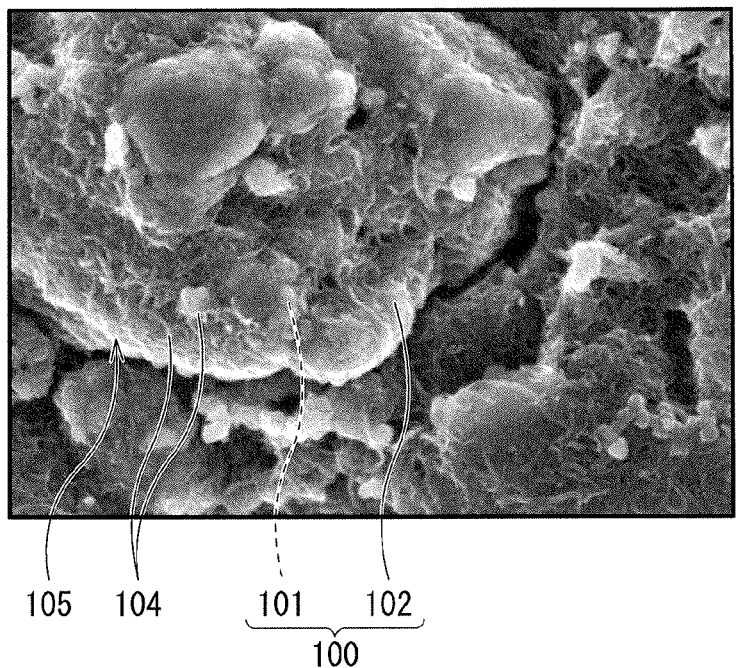
105  104    101  102
             \__/
              100
[ FIG. 8 ]
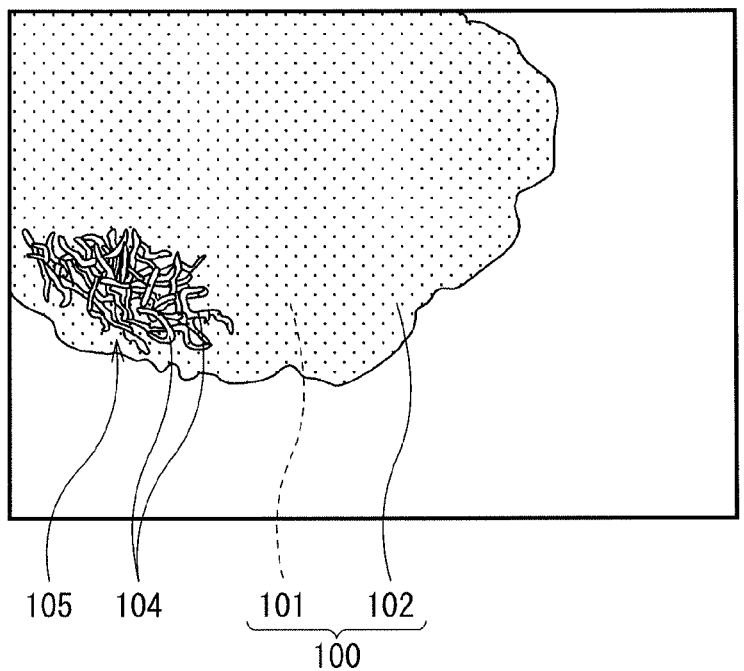
105  104    101  102
             \__/
              100

[ FIG. 9 ]
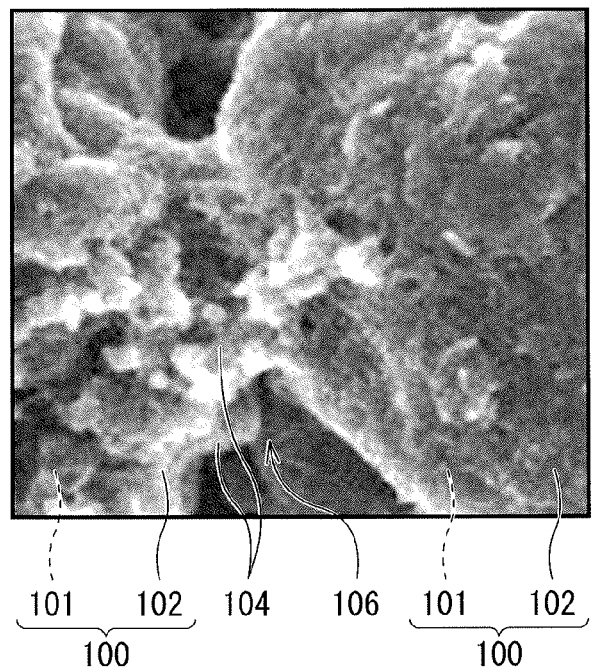
101 102 104 106 101 102
 100          100
[ FIG. 10 ]
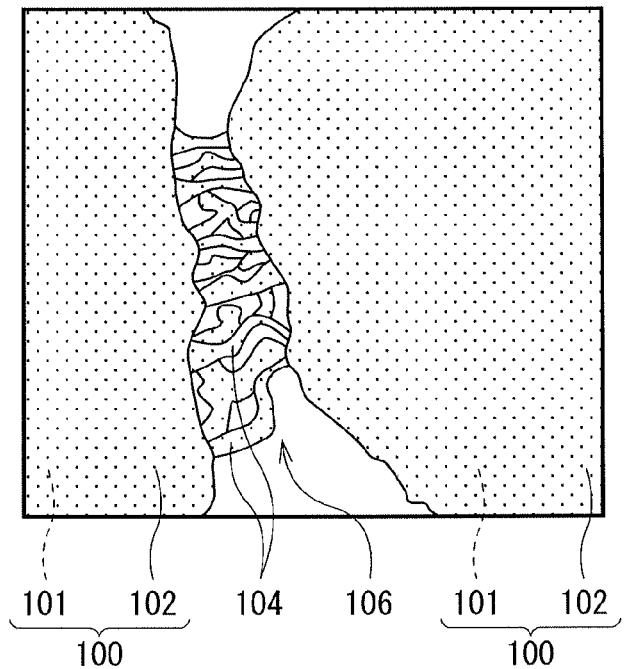
101 102 104 106 101 102
 100          100

[ FIG. 11 ]
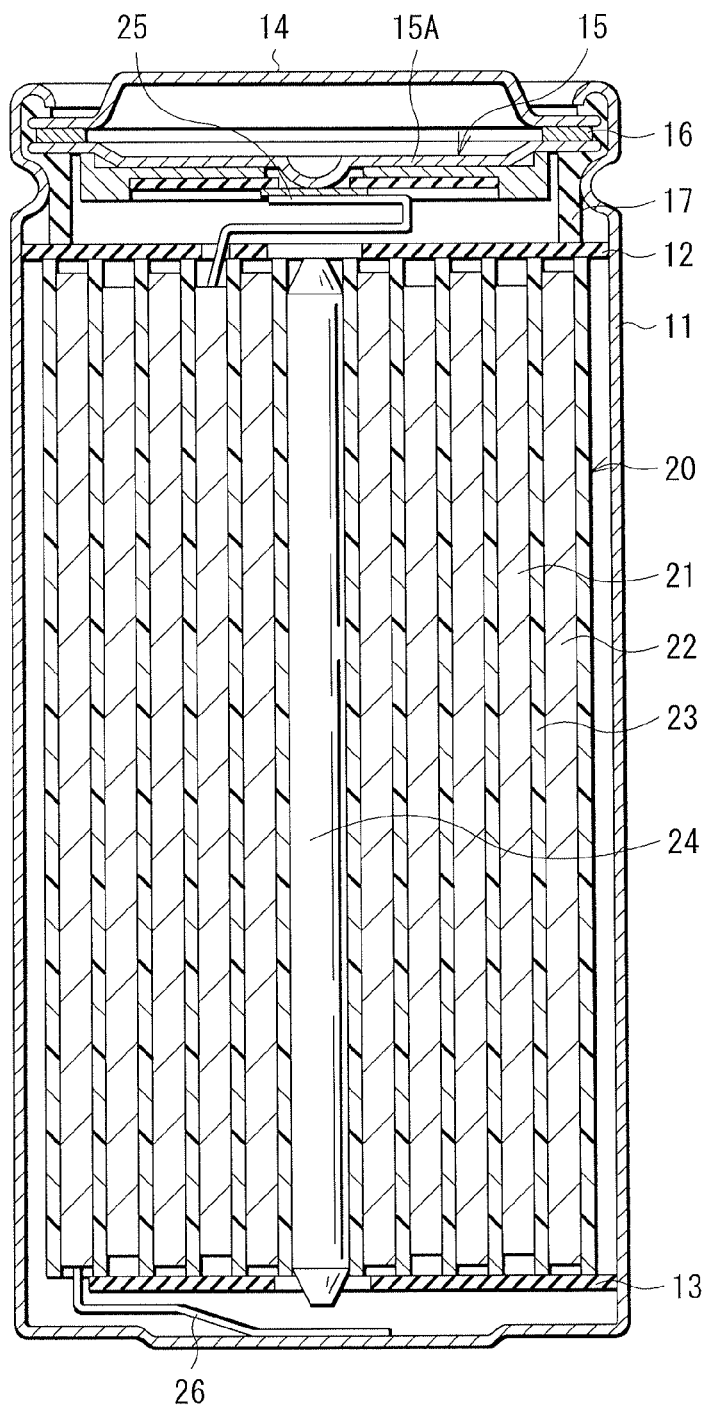

[ FIG. 12 ]
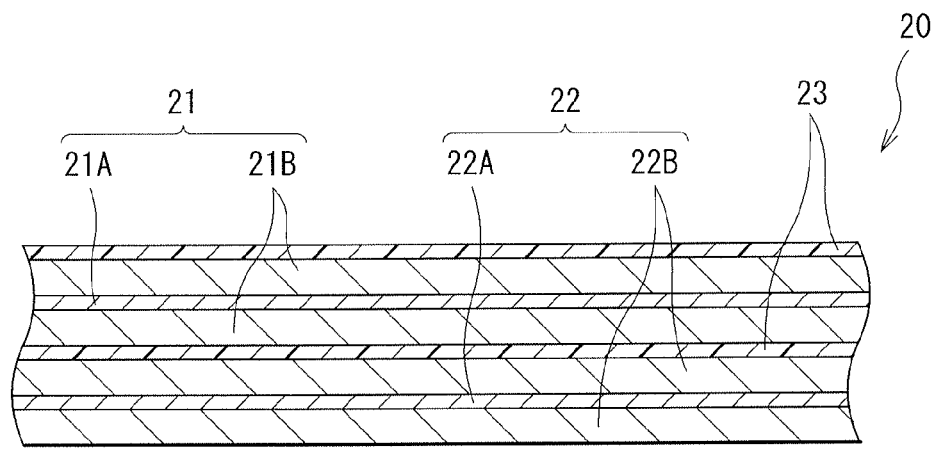
[ FIG. 13 ]
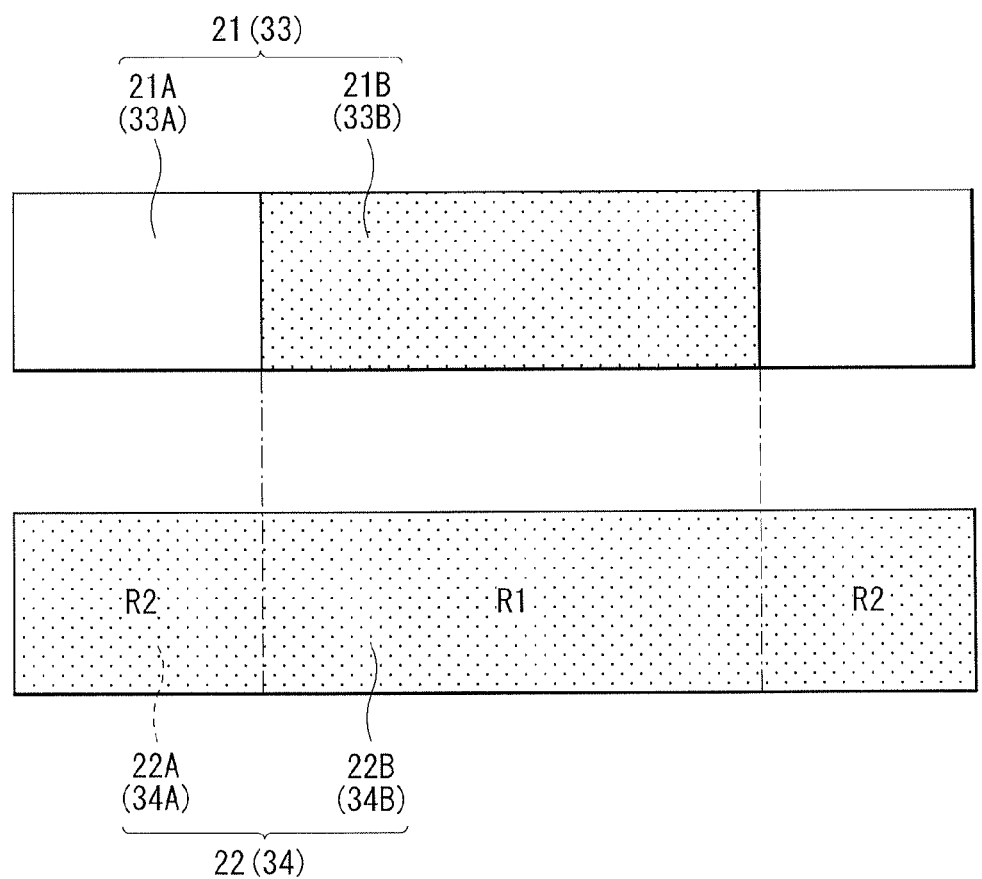

[ FIG. 14 ]
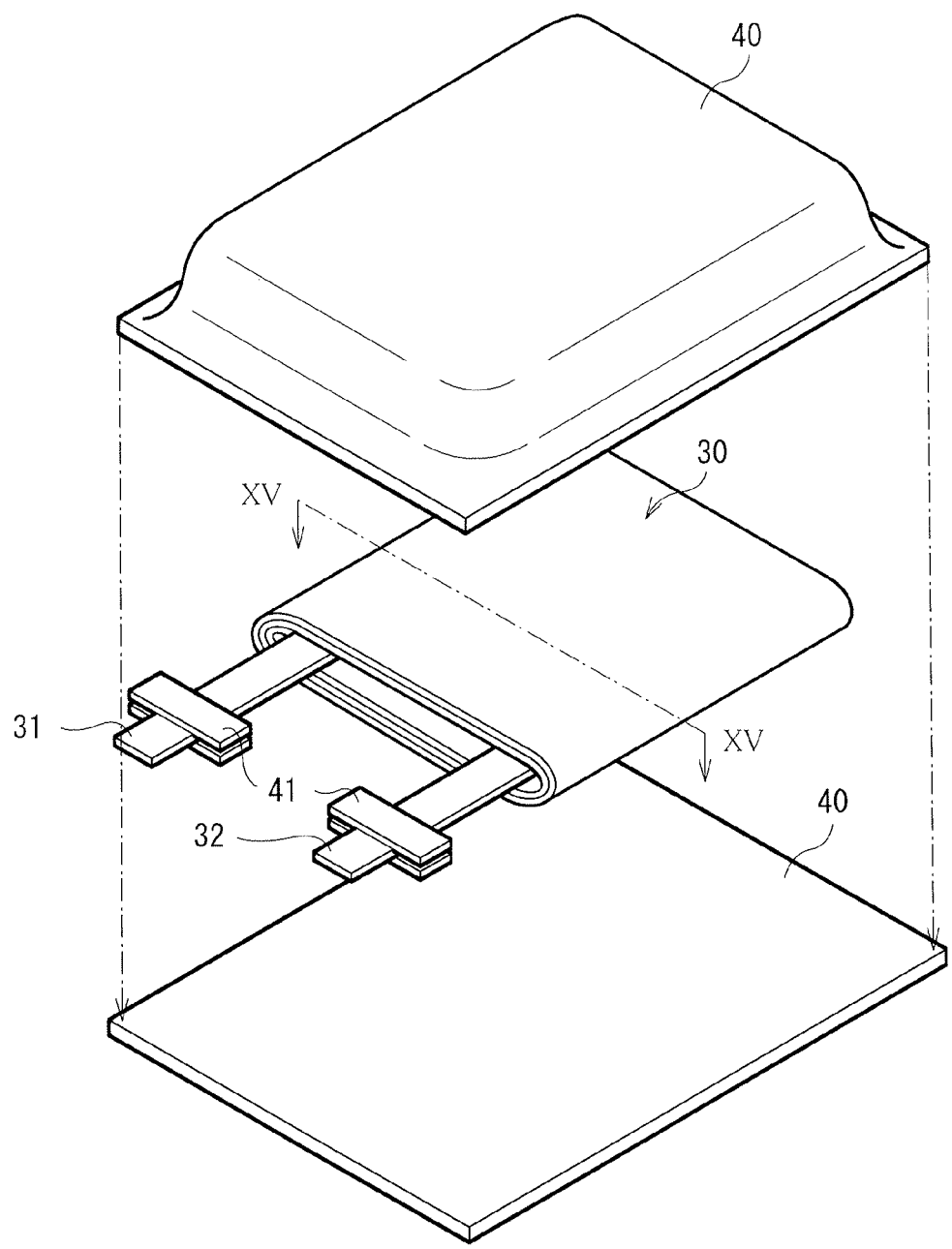

[ FIG. 15 ]
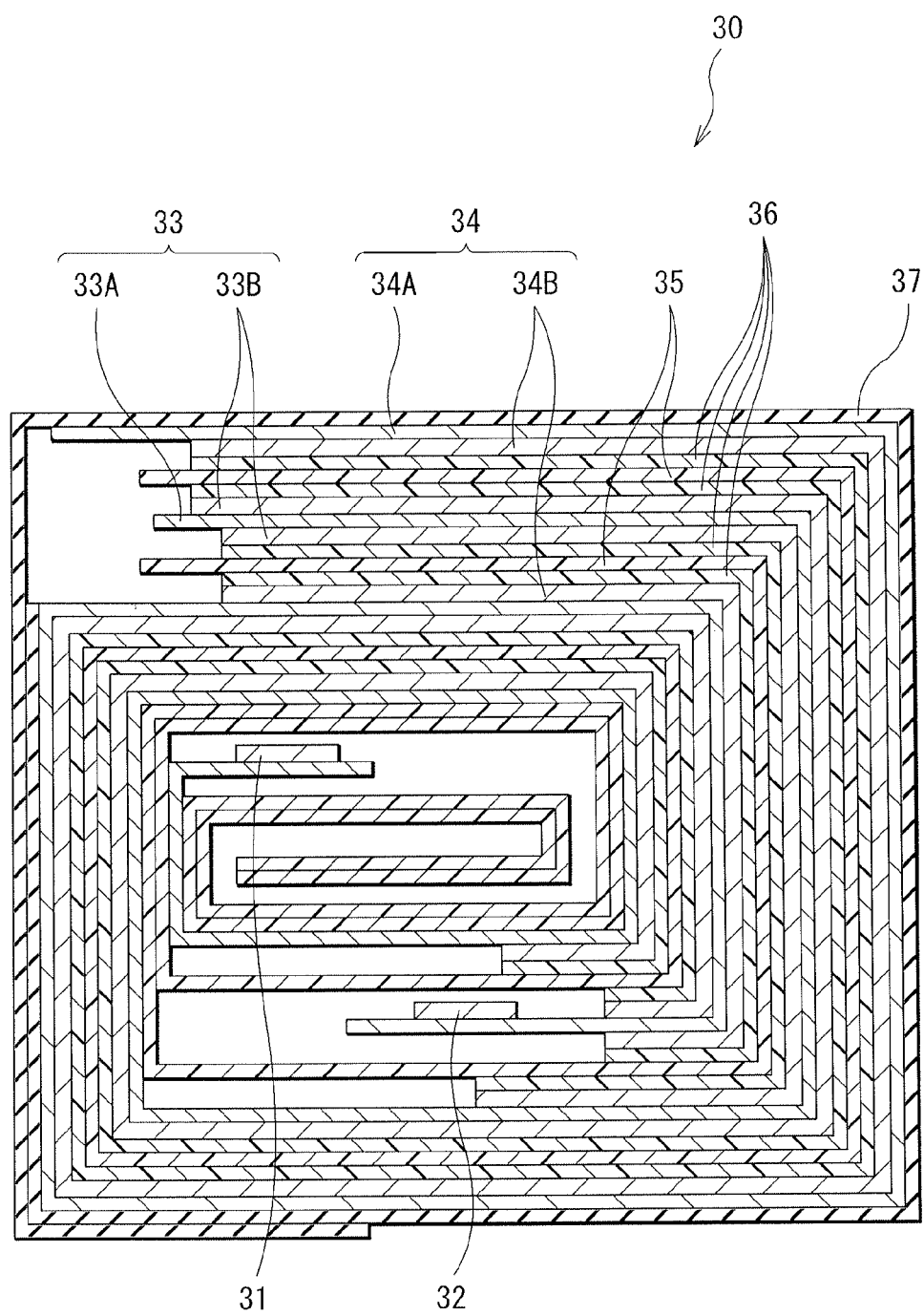

[ FIG. 16 ]
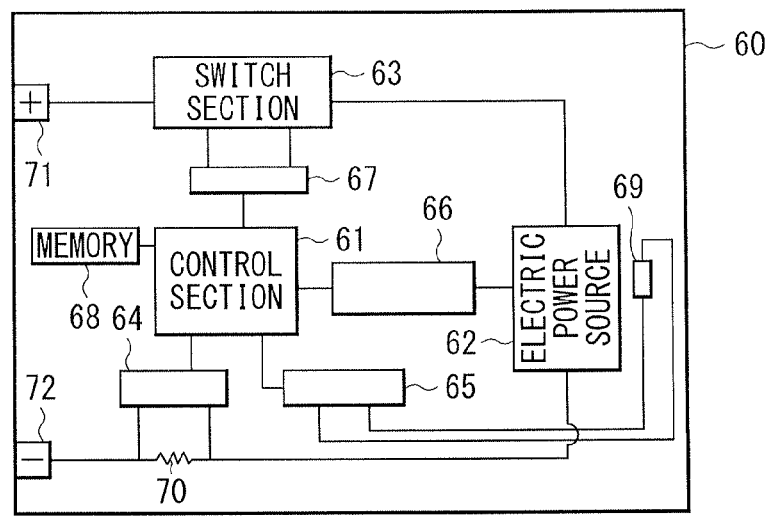
[ FIG. 17 ]
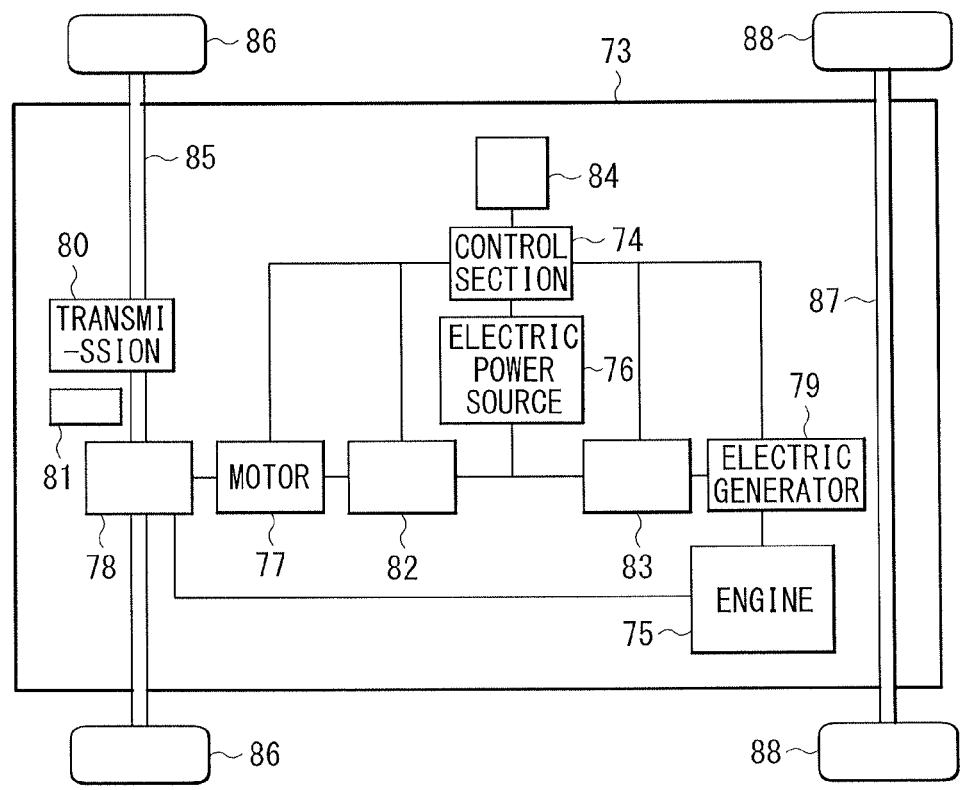

[ FIG. 18 ]
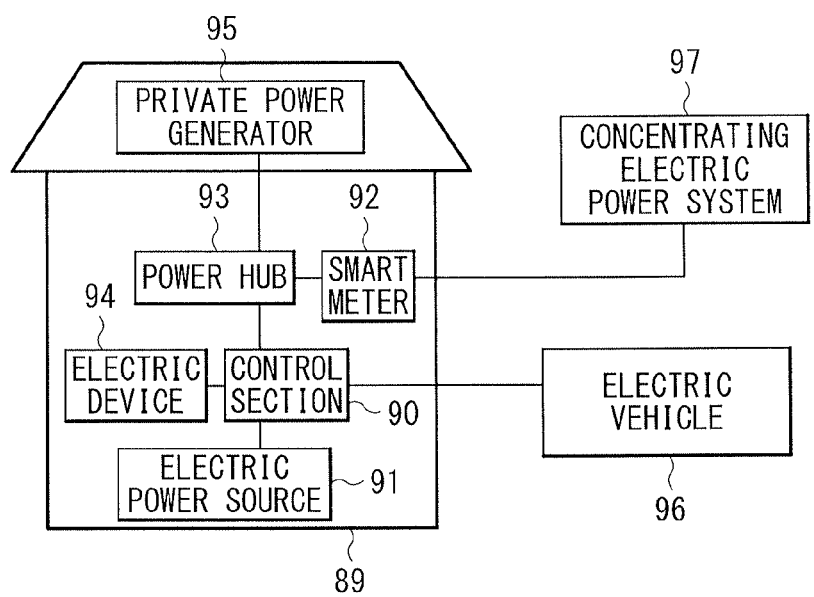
[ FIG. 19 ]
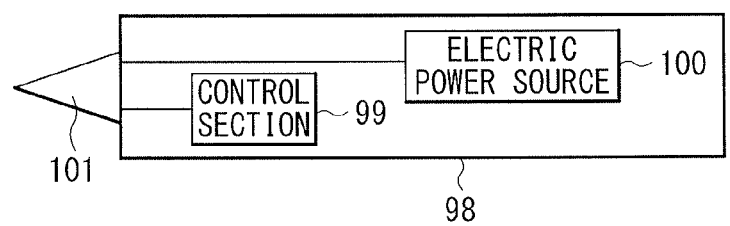

[ FIG. 20 ]
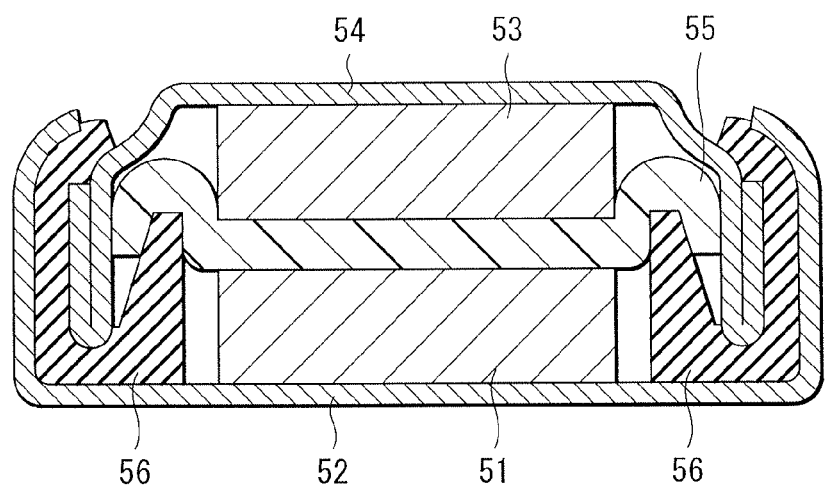

[ FIG. 21 ]
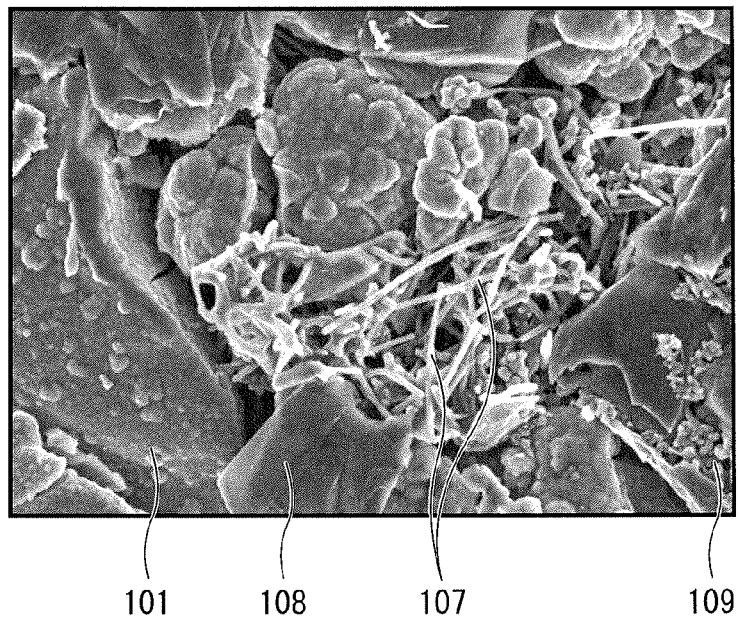
101　　108　　107　　109
[ FIG. 22 ]
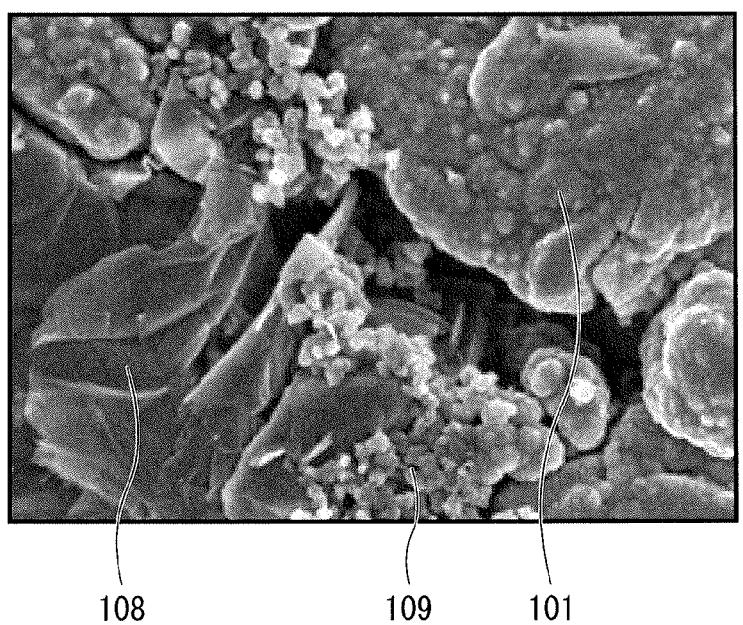
108　　　　109　101

ACTIVE MATERIAL, METHOD OF MANUFACTURING ACTIVE MATERIAL, ELECTRODE, AND SECONDARY BATTERY

CROSS-REFERENCE TO RELATED APPLICATION

The present application is a national phase entry under 35 U.S.C. § 371 of International Application No. PCT/JP2013/077117 filed Oct. 4, 2013, published on Apr. 10, 2014 as WO2014/054792 A1, which claims priority from Japanese Patent Application No. JP 2012-222774 filed in the Japanese Patent Office on Oct. 5, 2012.

TECHNICAL FIELD

The present technology relates to an active material that includes silicon (Si), tin (Sn), or both as constituent elements, to a method of manufacturing the active material, and to an electrode and a secondary battery that use the active material.

BACKGROUND ART

Various electronic apparatuses such as a mobile phone and a mobile information terminal device (PDA) have been widely used, and it has been demanded to further reduce the size and the weight of the electronic apparatuses and to achieve their longer lives. Accordingly, as an electric power source, a battery, in particular, a compact and light-weight secondary battery having high energy density has been developed.

In these days, application of the secondary battery is not limited to the above-described electronic apparatuses, and various applications have been considered. Representative examples of such various applications may include a battery pack attachably and detachably mounted on the electronic apparatuses or the like, an electric vehicle such as an electric automobile, an electric power storage system such as a home electric power server, and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant, because higher energy density is achieved thereby, compared to energy density in a battery such as a lead battery or a nickel-cadmium battery.

A secondary battery includes a cathode, an anode, and electrolytic solution. The anode includes an active material (anode active material) that is capable of inserting and extracting an electrode reactant. As the anode active material, a carbon material such as graphite has been widely used; however, it has been considered to use silicon therefor recently in order to further improve a battery capacity. One reason for this is because a theoretical capacity (4199 mAh/g) of silicon is remarkably larger than a theoretical capacity (372 mAh/g) of graphite, and it is therefore expected to largely improve the battery capacity thereby. In this case, tin is also considered promising that has a high theoretical capacity as with silicon.

However, because silicon or the like expands and contracts radically at the time of charge and discharge, the anode active material easily cracks mainly in the vicinity of a surface layer thereof. Crack of the anode active material causes a new highly-reactive surface (active surface) to be produced, which results in increase in the surface area (reactive area) of the anode active material. Accordingly, a decomposition reaction of electrolytic solution is caused in the new surface, and the electrolytic solution is used in order to form a coating film derived from the electrolytic solution on the new surface. This results in easier decrease in battery characteristics such as cycle characteristics.

Accordingly, various considerations have been made on a configuration of the secondary battery in order to improve the battery characteristics. Specifically, in order to control variation in volume at the time of charge and discharge and to improve electric conductivity, a surface of a composite particle of silicon and metal is covered with a carbon nanotube (for example, see Patent Literature 1). This carbon nanotube is formed by thermal decomposition and carbonization of hydrocarbon gas, and grows using a metal component in the composite particle as a catalyst.

PRIOR ART LITERATURE

Patent Literature

Patent Literature 1: Japanese Unexamined Patent Application Publication No. 2010-095797

SUMMARY OF THE INVENTION

An electronic apparatus in which a secondary battery is used, etc. have been further gaining higher performance and more functions, and frequency of using such electronic apparatus, etc. has increased. Hence, further improvement is desired in battery characteristics of the second battery.

Accordingly, it is desirable to provide an active material, a method of manufacturing an active material, an electrode, and a secondary battery that are capable of achieving superior battery characteristics.

An active material of an embodiment of the present technology includes a center portion, and a covering portion provided on part or all of the center portion. The center portion includes silicon, tin, or both as constituent elements, and the covering portion includes a plurality of fibrous carbon materials. Part or all of the fibrous carbon materials extend in a direction along a surface of the center portion and are closely attached to the center portion.

An electrode of an embodiment of the present embodiment includes an active material, and the active material has a configuration similar to the configuration of the active material of the present technology described above. Also, a secondary battery of an embodiment of the present embodiment includes a cathode, an anode, and non-aqueous electrolytic solution, and the anode has a configuration similar to the configuration of the electrode of the present technology described above.

A method of manufacturing an active material of an embodiment of the present technology includes bringing sol solution that includes a plurality of fibrous carbon materials into contact with part or all of a center portion that includes silicon, tin, or both as constituent elements, then heating the sol solution, and thereby forming a covering portion including the fibrous carbon materials.

According to the active material, the manufacturing method thereof, the electrode, or the secondary battery of an embodiment of the present technology, the covering portion that includes the fibrous carbon materials is formed on the center portion that includes silicon, etc. as constituent elements. Part or all of the fibrous carbon materials extend in the direction along the surface of the center portion, and are closely attached to the center portion. As a result, superior battery characteristics are achieved.

It is to be noted that the effect described here is not necessarily limitative, and any effect described in the present technology may be provided.

BRIEF DESCRIPTION OF DRAWINGS

FIG. 1 is a cross-sectional view illustrating a configuration of an electrode that uses an active material of an embodiment of the present technology.

FIG. 2 is a cross-sectional view illustrating a configuration of the active material.

FIG. 3 is a cross-sectional view illustrating another configuration of the active material.

FIG. 4 is a cross-sectional view illustrating still another configuration of the active material.

FIG. 5 is a scanning electron microscope (SEM) photograph of an active material layer.

FIG. 6 is a diagram schematically illustrating part of the active material layer shown in FIG. 5.

FIG. 7 is another SEM photograph of the active material layer.

FIG. 8 is a diagram schematically illustrating part of the active material layer shown in FIG. 7.

FIG. 9 is still another SEM photograph of the active material layer.

FIG. 10 is a diagram schematically illustrating part of the active material layer shown in FIG. 9.

FIG. 11 is a cross-sectional view illustrating a configuration of a secondary battery (cylindrical type) that uses the active material and the electrode according to embodiments of the present technology.

FIG. 12 is a cross-sectional view illustrating enlarged part of a spirally wound electrode body illustrated in FIG. 11.

FIG. 13 is a planar view schematically illustrating a configuration of a cathode and an anode illustrated in FIG. 12.

FIG. 14 is a perspective view illustrating a configuration of another secondary battery (laminated film type) that uses the active material and the electrode of embodiments of the present technology.

FIG. 15 is a cross-sectional view of a spirally wound electrode body taken along a line XV-XV illustrated in FIG. 14.

FIG. 16 is a block diagram illustrating a configuration of an application example (battery pack) of the secondary battery.

FIG. 17 is a block diagram illustrating a configuration of an application example (electric vehicle) of the secondary battery.

FIG. 18 is a block diagram illustrating a configuration of an application example (electric power storage system) of the secondary battery.

FIG. 19 is a block diagram illustrating a configuration of an application example (electric power tool) of the secondary battery.

FIG. 20 is a cross-sectional view illustrating a configuration of a test secondary battery (coin type).

FIG. 21 is a SEM photograph of an active material layer in a secondary battery in Example 1-2.

FIG. 22 is a SEM photograph of an active material layer in a secondary battery in Example 1-3.

MODES FOR CARRYING OUT THE INVENTION

An embodiment of the present technology is described below in detail with reference to the drawings. Incidentally, the description is provided in the following order.

1. Electrode Using Active Material
   1-1. Configurations of Active Material and Electrode
   1-2. Method of Manufacturing Active Material and Electrode
2. Secondary Battery
   2-1. Lithium Ion Secondary Battery (Cylindrical Type)
   2-2. Lithium Ion Secondary Battery (Laminated Film Type)
3. Applications of Secondary Battery
   3-1. Battery Pack
   3-2. Electric Vehicle
   3-3. Electric Power Storage System
   3-4. Electric Power Tool

[1. Electrode Using Active Material]

[1-1. Configurations of Active Material and Electrode]

FIG. 1 illustrates a cross-sectional configuration of an electrode that uses an active material of an embodiment of the present technology (hereinafter, may be simply referred to as "electrode" or "electrode of the present technology"). FIGS. 2 to 4 each illustrate a cross-sectional configuration of the active material.

[General Configuration of Electrode]

The electrode described here may be widely used in electrochemical devices for various applications. Examples of the electrochemical devices may include a secondary battery and a capacitor. The electrode may be used as a cathode, or may be used as an anode.

Here, as illustrated in FIG. 1, the electrode may include an active material layer 2 on a current collector 1, for example. The active material layer 2 may be provided on both surfaces of the current collector 1, or may be provided only on one surface thereof. However, the current collector 1 is not necessarily necessary. Hence, no current collector 1 may be provided.

[Current Collector]

The current collector 1 may be formed, for example, of a conductive material that is superior in electrochemical stability, electric conductivity, and mechanical strength. The conductive material may be, for example, one or more of materials such as copper (Cu), nickel (Ni), and stainless steel. In particular, a material that does not form an intermetallic compound with an electrode reactant and forms alloy with the active material layer 2 may be preferable.

"Electrode reactant" is a substance that serves as a medium in an electrode reaction, and may be lithium (Li) in a lithium ion secondary battery or the like, for example. Also, examples of "electrode reaction" may include charge and discharge reactions of a secondary battery.

The surface (the surface in contact with the active material layer 2) of the current collector 1 may be roughened, or may not be roughened. Examples of the current collector 1 that is not roughened may include a rolled metal foil. Examples of the current collector 1 that is roughened may include a metal foil that has been subjected to an electrolytic process, a sandblast process, and the like. The electrolytic process is a method of forming fine particles on a surface of a metal film or the like in an electrolytic bath by an electrolytic method. The metal film fabricated by the electrolytic method is generally called an electrolytic foil (for example, an electrolytic copper foil or the like).

In particular, the surface of the current collector 1 may be preferably roughened, because close-attachment characteristics of the active material layer 2 with respect to the current collector 1 are improved thereby due to an anchor effect. Surface roughness (for example, ten-point average roughness Rz or the like) of the current collector 1 is not particularly limited, but may be preferably as large as possible in order to improve the close attachment characteristics of the active material layer 2 by utilizing the anchor effect. However, the close attachment characteristics of the active material layer 2 may be decreased in contrast when the surface roughness is excessively large.

[Active Material Layer]

As illustrated in FIGS. 2 to 4, the active material layer 2 may include a plurality of active materials 100 that are capable of inserting and extracting the electrode reactant, for example. However, the active material layer 2 may further include other materials such as a binder and a conductor in addition to the active materials 100.

[Configuration of Active Material]

As illustrated in FIG. 2, the active material 100 includes a center portion 101 and a covering portion 102. The covering portion 102 may be provided on all of a surface of the center portion 101, or may be provided on part of the surface of the center portion 101. It is to be noted that, in the case where the covering portion 102 is provided on part of the center portion 101, the covering portion 102 may dot the part of the center portion 101 in a plurality of places.

[Center Portion]

The center portion 101 is a portion that substantially has a role of inserting and extracting the electrode reactant, in the active material 100. The center portion 101 includes silicon (Si), tin (Sn), or both as constituent elements, because silicon and tin have superior performance in inserting and extracting the electrode reactant, and therefore achieve high energy density.

A constituent material of the center portion 100 is not particularly limited as long as silicon, tin, or both are included therein as the constituent elements. Specifically, the constituent material of the center portion 100 may be a simple substance of silicon, alloy of silicon, a compound of silicon, a simple substance of tin, alloy of tin, or a compound of tin. Other than the above, the constituent material thereof may be two or more of the simple substance of silicon, the simple substance of tin, etc. described above, or may be a material that has one or more phases thereof in part or all thereof. It is to be noted that "simple substance" merely refers to a simple substance in a general sense and does not necessarily refer to a purity 100% simple substance. Hence, the simple substance may include a small amount of impurity. Also, "alloy" may include one or more of metalloid elements and non-metal elements as constituent elements.

The alloy of silicon may contain, for example, one or more of tin, nickel, copper, iron (Fe), cobalt (Co), manganese (Mn), zinc (Zn), indium (In), silver (Ag), titanium (Ti), germanium (Ge), bismuth (Bi), antimony (Sb), chromium (Cr), and the like as constituent elements other than silicon. The compound of silicon may include, for example, one or more of carbon (C), oxygen (O), and the like as constituent elements other than silicon. It is to be noted that the compound of silicon may include, for example, one or more of the series of elements described above for the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO.

The alloy of tin may include, for example, one or more of silicon, nickel, copper, iron, cobalt, manganese, zinc, indium, silver, titanium, germanium, bismuth, antimony, chromium, and the like as constituent elements other than tin. The compound of tin may include, for example, one or more of carbon, oxygen, and the like as constituent elements other than tin. It is to be noted that the compound of tin may include, for example, one or more of the series of elements described above for the alloy of tin, as constituent elements other than tin.

Specific examples of the alloy of tin and the compound of tin may include $SnO_w$ ($0<w\leq2$), $SnSiO_3$, LiSnO, and $Mg_2Sn$.

Moreover, the material containing tin as a constituent element may be, for example, a material that contains tin as a first constituent element, and contains a second constituent element and a third constituent element in addition thereto. The second constituent element may be, for example, one or more of cobalt, iron, magnesium (Mg), titanium, vanadium (V), chromium, manganese, nickel, copper, zinc, gallium (Ga), zirconium (Zr), niobium (Nb), molybdenum (Mo), silver, indium, cerium (Ce), hafnium (Hf), tantalum (Ta), tungsten (W), bismuth, silicon, and the like. The third constituent element may be, for example, one or more of boron (B), carbon, aluminum (Al), phosphorus (P), and the like. One reason for this is because high energy density is achieved by containing the second and third constituent elements.

In particular, a material (SnCoC-containing material) that includes tin, cobalt, and carbon as constituent elements may be preferable. In the SnCoC-containing material, for example, the content of carbon may be from 9.9 mass % to 29.7 mass %, and the ratio of contents of tin and cobalt (Co/(Sn+Co)) may be from 20 mass % to 70 mass %, because high energy density is achieved thereby.

The SnCoC-containing material may preferably have a phase including tin, cobalt, and carbon. Such a phase may be preferably low-crystalline or amorphous. The phase is a reaction phase capable of reacting with the electrode reactant. Hence, superior characteristics are achieved due to existence of the reaction phase. A half bandwidth of a diffraction peak obtained by X-ray diffraction of this phase may be preferably equal to or larger than 1 deg at a diffraction angle of 2θ in a case where CuKα ray is used as a specific X-ray, and the insertion rate is 1 deg/min. One reason for this is because the electrode reactant is more smoothly inserted and extracted thereby, and reactivity with the electrolytic solution is decreased. It is to be noted that, in some cases, the SnCoC-containing material may include a phase including a simple substance or part of the respective constituent elements in addition to the low-crystalline phase or the amorphous phase.

Whether or not the diffraction peak obtained by the X-ray diffraction corresponds to the reaction phase capable of reacting with the electrode reactant is allowed to be easily determined by comparison between X-ray diffraction charts before and after an electrochemical reaction with the electrode reactant. For example, if the position of the diffraction peak after electrochemical reaction with the electrode reactant is changed from the position of the diffraction peak before the electrochemical reaction with the electrode reactant, the obtained diffraction peak corresponds to the reaction phase capable of reacting with the electrode reactant. In this case, for example, the diffraction peak of the low crystalline reaction phase or the amorphous reaction phase is seen in a range of 2θ=from 20 deg to 50 deg. Such a reaction phase may include, for example, the foregoing respective constituent elements, and it may be considered that such a reaction phase is caused to be low crystalline or amorphous mainly because of the existence of carbon.

In the SnCoC-containing material, part or all of carbon as a constituent element may be preferably bonded to a metal element, a metalloid element, or both as other constituent elements, because aggregation or crystallization of tin and/or the like is suppressed thereby. The bonding state of elements may be confirmed, for example, by X-ray photoelectron spectroscopy (XPS). In a commercially-available apparatus, for example, Al-Kα ray, Mg-Kα ray, or the like may be used as a soft X-ray. In the case where part or all of carbons are bonded to a metal element, a metalloid element, and the like, the peak of a synthetic wave of 1s orbit (C1s) of carbon appears in a region lower than 284.5 eV. It is to be noted that energy calibration is made so that the peak of 4f orbit (Au4f) of gold (Au) atom is obtained at 84.0 eV. At this time, in general, because surface contamination carbon exists on the material surface, the peak of C1s of the surface contamination carbon is regarded as 284.8 eV, which is used as an energy reference. In XPS measurement, the waveform of the peak of C1s is obtained as a form including the peak of the surface contamination carbon and the peak of carbon in the SnCoC-containing material. Therefore, for example, analysis may be made with the use of commercially-available software to isolate both peaks from each other. In the waveform analysis, the position of the main peak existing on the lowest bound energy side is considered the energy reference (284.8 eV).

It is to be noted that the SnCoC-containing material is not limited to the material (SnCoC) including only tin, cobalt, and carbon as constituent elements. The SnCoC-containing material may further include, for example, one or more of silicon, iron, nickel, chromium, indium, niobium, germanium, titanium, molybdenum, aluminum, phosphorus, gallium, bismuth, and the like as constituent elements, in addition to tin, cobalt, and carbon.

Other than the SnCoC-containing material, a material (SnCoFeC-containing material) that includes tin, cobalt, iron, and carbon as constituent elements may be also preferable. The SnCoFeC-containing material may have any composition. To give an example, when the content of iron is set smaller, the content of carbon may be from 9.9 mass % to 29.7 mass %, the content of iron may be from 0.3 mass % to 5.9 mass %, and the ratio of contents of tin and cobalt (Co/(Sn+Co)) may be from 30 mass % to 70 mass %. Alternatively, when the content of iron is set larger, the content of carbon may be from 11.9 mass % to 29.7 mass %, the ratio of contents of tin, cobalt, and iron ((Co+Fe)/(Sn+Co+Fe)) may be from 26.4 mass % to 48.5 mass %, and the ratio of contents of cobalt and iron (Co/(Co+Fe)) may be from 9.9 mass % to 79.5 mass %. One reason for this is because, in such a composition range, high energy density is achieved. It is to be noted that the physical characteristics (such as a half bandwidth) of the SnCoFeC-containing material are similar to the physical characteristics of the SnCoC-containing material described above.

In particular, the center portion 101 may preferably include silicon and oxygen as constituent elements, because high energy density is easily maintained thereby even when the electrode reaction is performed repeatedly. The center portion 101 may have any configuration as a whole as long as the center portion 101 includes silicon and oxygen as constituent elements.

Configuration Example 1 of Center Portion

Specifically, as illustrated in FIG. 2, the center portion 101 may be a single granular body, for example. An atomic ratio of this center portion 101 ($SiO_z$), specifically, an atomic ratio z (O/Si) of oxygen to silicon is not particularly limited, but may preferably satisfy $0.5 \leq z \leq 1.8$, for example.

It is to be noted that the center portion 101 may include one or more of iron, aluminum, chromium, nickel, boron, magnesium, calcium (Ca), titanium, vanadium, manganese, cobalt, copper, germanium, yttrium (Y), zirconium, molybdenum, silver, indium, tin, antimony, tantalum, tungsten, lead (Pd), lanthanum (La), cerium, praseodymium (Pr), neodymium (Nd), and the like as constituent elements together with silicon and oxygen, because an electric resistance of the center portion 101 is decreased thereby.

Configuration Example 2 of Center Portion

As illustrated in FIG. 3, the center portion 101 may be a composite granular body that includes an inner portion 101A and an outer portion 101B, for example. The outer portion 101B may be provided on all of a surface of the inner portion 101A, or may be provided on part of the surface of the inner portion 101A. In the latter case, the outer portion 101B may dot the part of the surface of the inner portion 101A in a plurality of places.

An atomic ratio x of the inner portion 101A ($SiO_x$) is not particularly limited, but may preferably satisfy $0 \leq x < 0.5$, for example, because this causes the inner portion 101A to insert and extract the electrode reactant easily at the time of the electrode reaction. However, x may be preferably as small as possible, and x may be more preferably 0. One reason for this is because high energy density is achieved thereby, and degradation of the inner portion 101A is suppressed thereby. It is to be noted that the inner portion 101A may further include iron and/or the like as constituent elements for a reason similar to the reason described above for the center portion 101 that is a single granular body.

An atomic ratio y of the outer portion 101B ($SiO_y$) is not particularly limited, but may preferably satisfy $0.5 \leq y \leq 1.8$ for example, because this allows the active material 100 to be less likely to be degraded even when the electrode reaction is performed repeatedly. Accordingly, the inner portion 101A is physically and chemically protected by the outer portion 101B while entering and exiting of the electrode reactant with respect to the inner portion 101A is secured.

In detail, when the outer portion 101B is present between the inner portion 101A and the electrolytic solution, the inner portion 101A that has high reactivity is less likely to be in contact with the electrolytic solution. As a result, a decomposition reaction of the electrolytic solution is suppressed. In this case, the outer portion 101B may be formed of a material that is of a type similar to a type of the material of the inner portion 101A, specifically, a material including a common element (silicon, in this example) as a constituent element. Accordingly, close attachment characteristics of the outer portion 101B with respect to the inner portion 101A are increased.

Also, the outer portion 101B has flexibility (characteristics of being easily transformed). Hence, when the inner portion 101A expands or contracts at the time of the electrode reaction, the outer portion 101B expands or contracts (stretches or shrinks) more easily according thereto. This makes it less likely for the outer portion 101B to be damaged (ruptured, etc.) when the inner portion 101A expands or contracts. Hence, a state in which the inner portion 101A is covered with the outer portion 101B is maintained, even when the electrode reaction is performed repeatedly. Accordingly, a new surface is less likely to be exposed when the inner portion 101A cracks at the time of electrode reaction, and the new surface is less likely to be in contact with the electrolytic solution. This remarkably suppresses the decomposition reaction of the electrolytic solution.

The outer portion 101B may be configured of a single layer or multiple layers. In particular, the outer portion 101B may be preferably configured of multiple layers, because this makes it easier for a space (void) for stress relaxation to be formed between layers in the outer portion 101B. It is to be noted that the outer portion 101B may include a multi-layer structure in part thereof.

Configuration Example 3 of Center Portion

It is to be noted that, as illustrated in FIG. 4, the active material 100 may include an intermediate portion 103 provided on the center portion 101, and the covering portion 102 may be provided on the center portion 101 with the intermediate portion 103 in between, for example. One reason for this is because the close attachment characteristics of the covering portion 102 with respect to the center portion 101 are improved thereby. The intermediate portion 103 may be provided on all of the surface of the center portion 101, or may be provided on part of the surface of the center portion 101. In the latter case, the covering portion 102 may dot the part of the surface of the center portion 101 in a plurality of places.

The intermediate portion 103 may preferably have an electric resistance that is lower than the electric resistance of the center portion 101, because the electric resistance of the active material 100 is decreased thereby. Specifically, the intermediate portion 103 may preferably include carbon having high conductivity and/or the like as constituent elements for example, because a higher effect is achieved thereby. Specific examples of a constituent material of the intermediate portion 103 may include a carbon material, etc. that are described later as "other active material". It is to be noted that the intermediate portion 103 may include one or more of hydrogen, oxygen, and the like as constituent elements together with carbon.

[Covering Portion]

The covering portion 102 is a portion, of the active material 100, that protects the center portion 101, and includes a plurality of fibrous carbon materials. The covering portion 102 has a characteristic structure as a result mainly of a formation method (using sol solution) described later. Specifically, part or all of the fibrous carbon materials extend in a direction along the surface of the center portion 101. Further, part or all of the fibrous carbon materials lie along the surface of the center portion 101 and are closely attached to the center portion 101. In particular, the part or all of the fibrous carbon materials may be preferably tangled with one another while extending in the direction along the surface of the center portion 101, and may more preferably form a mesh structure (mesh-like conductive network) as a whole. A detailed configuration of the covering portion 102 is described later.

"Fibrous" of the fibrous carbon material refers to a three-dimensional shape having a length (fiber length) that is sufficiently larger than a diameter (fiber diameter) thereof, that is, an elongated three-dimensional shape (having a high aspect ratio). The aspect ratio is not particularly limited. However, the aspect ratio may be preferably 5 or larger in particular, because this makes it easier for the fibrous carbon materials to extend in the direction along the surface of the center portion 101 and to be closely attached to the center portion 101. Hence, the fibrous carbon material may be configured of any material as long as the material has the elongated three-dimensional shape. Specifically, the fibrous carbon materials may be, for example, one or more carbon nanotubes, one or more carbon nanofibers, or both. The carbon nanotubes and the carbon nanofibers may encompass vapor grown carbon fibers (VGCF) and the like.

One reason why the covering portion 102 is provided on the center portion 101 is because the center portion 101 is physically and chemically protected by the covering portion 102. In detail, because the fibrous carbon materials are closely attached to the center portion 101 while extending in the direction along the surface of the center portion 101, the close attachment force of the covering portion 102 with respect to the center portion 101 and physical strength of the covering portion 102 are remarkably improved. In this case, the center portion 101 is less likely to crack even when the center portion 101 expands or contracts at the time of the electrode reaction because the center portion 101 is firmly held from the outside thereof by the covering portion 102. Hence, it is less likely for a new surface having high reactivity to be formed. This suppresses degradation of the active material 100. Also, in a case where the electrode is used for an electrochemical device together with electrolytic solution, a decomposition reaction of the electrolytic solution resulting from reactivity of the electrode is also suppressed. Further, electric conductivity of the active material 100 is improved, because the covering portion 102 is carbonaceous. It is to be noted that the close attachment force and the physical strength of the covering portion 102 described above are further improved when the fibrous carbon materials are tangled with one another, and are further more improved when the fibrous carbon materials form the mesh structure.

A rate of the covering portion 102 (the fibrous carbon materials) in the active material 100 (the center portion 101 and the covering portion 102) is not particularly limited. However, in particular, the rate thereof may be preferably from 0.1 wt % to 10 wt %, and may be more preferably from 0.5 wt % to 5 wt %, because a high discharge capacity is thereby obtained in the center portion 101 and the mesh structure is thereby easier to be formed in the covering portion 102.

Here, part or all of the fibrous carbon materials may each have one or more functional groups (surface functional groups) on a surface thereof. The kind of the surface functional group is not particularly limited, but may be preferably a group that includes oxygen as a constituent element in particular. More specifically, a hydroxyl group (—OH), a carboxyl group (—COOH), or both may be preferable, and the carboxyl group may be more preferable, because this causes the fibrous carbon materials to extend in the direction along the surface of the center portion 101 more easily and to closely attach to the center portion 101 more easily, in a process of forming the covering portion 102 with the use of the sol solution described later. In order to specify the kind of the surface functional group, surface analysis may be performed on the fibrous carbon materials by XPS, for example. It is to be noted that, in order to analyze the fibrous carbon materials included in the sol solution, the sol solution may be subjected to a centrifugation process to throw away the supernatant, and a precipitated material (water-containing cake) may be dried in vacuum to be subjected to analysis, for example.

Moreover, a peak derived from a 1s orbit (O1s) of oxygen may be preferably detected when the fibrous carbon materials are subjected to element analysis by XPS, because an affinity between the fibrous carbon material and a polar group (such as —OH) that is present on an uppermost surface of the underlying center portion 101 (or the intermediate portion 103) is increased thereby. This makes it easier for the fibrous carbon materials to be closely attached to the center portion 101 while extending in the direction along the surface of the center portion 101 in a manner similar to that in the case described above concerning the surface functional group.

Here, dimensions (the fiber length and the fiber diameter) of the fibrous carbon materials are not particularly limited as long as the high aspect ratio described above is secured thereby.

In particular, the fiber lengths of the fibrous carbon materials may be preferably distributed so as to satisfy a specific condition. More specifically, a rate (short fiber rate: %) of fibrous carbon materials having fiber lengths of 4 nm or smaller out of the fibrous carbon materials may be preferably 85% or higher, and may be more preferably 90% or higher, because the fibrous carbon materials are dispersed uniformly in the sol solution thereby, which makes it less likely for the fibrous carbon materials to be aggregated. Accordingly, the fibrous carbon materials become easier to extend in the direction along the surface of the center portion 101, and become easier to be closely attached to the center portion 101. This causes the covering portion 102 to be less likely to be detached from the center portion 101 even when the center portion 101 expands or contracts at the time of charge and discharge. Moreover, because the fibrous carbon materials are collected in an extent of not being aggregated, it becomes easier for the mesh structure to be formed. It is to be noted that one reason why the attention is paid on "4 μm" as the fiber length is because tendency of dispersion of the fibrous carbon materials are likely to be changed at that fiber length (=4 μm) as a threshold.

A procedure for examining the short fiber rate may be as follows, for example. First, sol solution in which the fibrous carbon materials are dispersed is prepared. Subsequently, the sol solution is diluted with hundred parts of a solvent that is of the same kind of a solvent in the sol solution. Subsequently, the diluted solution is applied onto a surface of a copper foil and then the applied diluted solution is dried to form a coating film. Subsequently, the coating film is observed with the use of a scanning electron microscope (S-4800 available from Hitachi High-Technologies Corporation) to obtain a secondary electron image. As conditions of the observation, an acceleration voltage is set to 15 kV and an emission current is set to 20 μA. Lastly, fiber lengths (major axis: nm) of two thousand arbitrary fibrous carbon materials that are present in the secondary electron image are measured with the use of an image processing software (ImageJ). Based on a result thereof, short fiber rate (%)=(the number of the fibrous carbon materials having fiber lengths of 4 μm or smaller/the number of all of the fibrous carbon materials)×100 is calculated.

Moreover, the average fiber diameter (nm) of the fibrous carbon materials may be preferably 102 nm or smaller, and may be more preferably 80 nm or smaller. One reason for this is because, for a reason similar to the reason described above concerning the short fiber rate, the fibrous carbon materials are dispersed uniformly, which makes it easier for the fibrous carbon materials to be closely attached to the center portion 101 and causes the mesh structure to be easier to be formed. In this case, the number of the fibrous carbon materials per weight is increased, and the mesh structure is therefore formed easily. It is to be noted that, when the average fiber diameter is larger than 102 nm, the flexibility of the fibrous carbon material is decreased, which may makes it more difficult for the fibrous carbon materials to extend along the surface (curved surface) of the center portion 101.

In a procedure for examining the average fiber diameter, the fiber diameters (nm) of two thousand fibrous carbon materials that are present in the secondary electron image are measured by a procedure similar to the procedure in the case of examining the short fiber rate, and then an average value thereof is calculated.

Other than the above, physical characteristics of the fibrous carbon materials contained in the covering portion 102 are not particularly limited. However, in particular, the fibrous carbon materials may be preferably subjected to a graphitization process by a heat process. In accordance thereto, an analysis result (Raman spectrum) of the covering portion 102 (the fibrous carbon materials) that has been analyzed by Raman spectroscopy may preferably satisfy a specific condition. Specifically, when paying attention to D-band peak and G-band peak, a ratio between the areas of the respective peaks (G/D ratio: the area of the G-band peak/the area of the D-band peak) may be preferably 1 or larger, and may be more preferably 3 or larger, because a rate of low-crystalline carbon part is reduced in the fibrous carbon materials. Accordingly, the electrolytic solution is made less likely to be decomposed on the active surfaces of the fibrous carbon materials. Also, irreversible insertion of the electrode reactant into a fine void in the fibrous carbon materials is suppressed. It is to be noted that a temperature used at the time of the heat process is not particularly limited as long as the temperature allows the G/D ratio to satisfy the above-described condition, but may be 2000 deg C. or higher, for example.

A procedure for examining the G/D ratio may be as follows, for example. First, sol solution in which the fibrous carbon materials are dispersed is prepared, and the sol solution is subjected to centrifugation with the use of a centrifuge to separate the sol solution into a solvent and a solid content. Subsequently, the solid content is dried in vacuum to remove a residual solvent. Subsequently, the solid content is analyzed with the use of a Raman spectroscopy apparatus (Raman-11 available from Nanophoton Corporation) to obtain Raman spectrum. Observation is performed in a state where output is 0.2 mW under the analysis conditions in which a laser wavelength is set to 532 nm, magnification is set to 50-fold, integrated second is set to 30 seconds, and a filter size is set to ND 200. Subsequently, the D-band peak detected around 1350 $cm^{-1}$ and the G-band peak detected around 1580 $cm^{-1}$ are divided from other peaks by fitting with the use of Lorenz function. Lastly, after determining the area of the D-band peak and the area of the G-band peak, the G/D ratio=the area of the G-band peak/the D-band peak is calculated.

It is to be noted that an average particle size of the center portion 101 is not particularly limited; however, the median size (D50) of the center portion 101 may be preferably 7.8 μm or smaller in particular, because physical strength of the center portion 101 is secured easily thereby. It is to be noted that, when D50 is larger than 7.8 μm, the center portion 101 expands and contracts at the time of charge and discharge, which may result in decrease in physical strength of the active material 100. However, when D50 is excessively small, a particle interface of the active material 100 is increased, which may result in decrease in conductivity of the active material layer 2. However, conductivity of the active material layer 2 is secured due to provision, on the center portion 101, of the covering portion 102 including the fibrous carbon materials. D50 may be measured with the use of a laser-diffraction-type particle size distribution measuring apparatus (nano-particle size distribution measuring apparatus SALD-7100 available from Shimadzu Corporation), for example.

[Detailed Configuration of Active Material]

Here, referring to FIGS. 5 to 10, a detailed configuration of the active material 100 is described. FIGS. 5, 7, and 9 are SEM photographs of the active material 100. FIGS. 6, 8, and 10 schematically illustrate part of the SEM photographs shown in FIGS. 5, 7, and 9, respectively.

As shown in FIGS. 5 to 8, the surface of the center portion 101 is covered with the covering portion 102 in the active material 100. It is to be noted that, as described above, the surface of the center portion 101 is not limited to that in a case (FIGS. 2 and 3) where the surface of the center portion 101 is directly covered with the covering portion 102, and a case (FIG. 4) in which the surface of the center portion 101 is indirectly covered with the covering portion 102 with the intermediate portion 103 in between may be possible.

As shown in FIGS. 5 and 6, fibrous carbon materials 104 included in the covering portion 102 are concentrated to the vicinity of the surface of the center portion 101, and are present to be attached to the surface of the center portion 101. Specifically, the fibrous carbon materials 104 do not extend from the center side to the outer side of the center portion 101, but extend in the direction along the surface of the center portion 101 and are closely attached to the center portion 101. In this case, it is enough that at least part of one fibrous carbon material 104 is closely attached to the center portion 101. In particular, the entire fibrous carbon material 104 (all of one end portion, a middle portion, and the other end portion thereof) may be preferably closely attached to the center portion 101. However, in order to achieve the above-described advantage derived from the covering portion 102, it is not necessary for all of the fibrous carbon materials 104 to extend in the direction along the surface of the center portion 101, and part of the fibrous carbon materials 104 may extend in that direction. In this case, the fibrous carbon materials 104 may be preferably tangled with one another.

In particular, as shown in FIGS. 7 and 8, the fibrous carbon materials 104 may be preferably tangled with one another while extending in the direction along the surface of the center portion 101, and may preferably form a mesh structure 105 thereby. In this case, the mesh structure 105 having multiple layers (three-dimensional structure) may be formed due to overlapping of the fibrous carbon materials 104 that are tangled with one another.

In particular, as shown in FIGS. 9 and 10, part of the fibrous carbon materials 104 may be preferably cross-linked with each other between adjacent active materials 100, for example. One reason for this is because the physical strength of the covering portion 102 is further improved thereby, and electric conductivity between the active materials 100 is also further improved thereby. In this case, a cross-link portion 106 is formed in a gap between the active materials 100 by the respective fibrous carbon materials 104 that are present on the surfaces of the different center portions 101.

It is to be noted that the content of illustration is simplified in FIGS. 6, 8, and 10. Specifically, only an outline of one active material 100 is illustrated, and only outlines of part of the fibrous carbon materials 104 are illustrated in each of FIGS. 6 and 8. Also, illustration of the fibrous carbon materials 104 that are present on the surface of the center portion 101 is omitted in FIG. 10.

The binder may include, for example, one or more of synthetic rubbers, polymer materials, and the like. Examples of the synthetic rubber may include styrene-butadiene-based rubber, fluorine-based rubber, and ethylene propylene diene. Examples of the polymer material may include polyvinylidene fluoride, polytetrafluoroethylene, polyimide, polyamide, polyamide imide, aramid, polyacrylate, lithium polyacrylate, sodium polyacrylate, polymaleic acid, and copolymers thereof. Other than the above, the polymer material may be calboxymethyl cellulose, styrene-butadiene rubber, polyvinyl alcohol, etc., for example.

In particular, in a case where a content of the active material 100 in the active material layer 2 is 50 wt % or more, the binder may be preferably one or more of polyimide, polyamide imide, aramid, and polyacrylic acid, because high binding characteristics are achieved thereby.

The conductor may include, for example, one or more of carbon materials such as graphite, carbon black, acetylene black, and Ketjen black. It is to be noted that an anode conductor may be a metal material, a conductive polymer, etc., as long as the anode conductor is the material having conductivity.

It is to be noted that the active material layer 2 may further include one or more of other active materials in addition to the active material 100 described above.

"Other active material" may be a material that includes carbon as a constituent element, for example. More specifically, "other active material" may be preferably a carbon material, because the electric resistance of the active material layer 2 is decreased, and the active material layer 2 is made less likely to expand or contract at the time of charge and discharge.

Moreover, when the other active material is the carbon material, the following advantage is also achieved. When the other active material (carbon material) is substituted for part of the active material 100, the electrode is made less likely to expand or contract at the time of charge and discharge; but on the other hand, the charge and discharge capacity per weight of the electrode is decreased and an influence of an irreversible capacity derived from the fibrous carbon materials is increased. Hence, a secondary battery using an electrode has a tendency that the initial discharge capacity is likely to be decreased. However, when the fibrous carbon materials are provided on the center portion 101 in a state of being contained in the covering portion 102, and in particular, the G/D ratio of the fibrous carbon materials is made appropriate, the influence of the irreversible capacity described above is suppressed, which makes the initial discharge capacity to be less likely to be decreased.

Examples of the carbon material may include graphitizable carbon, non-graphitizable carbon having a spacing of (002) plane of 0.37 nm or larger, and graphite having a spacing of (002) plane of 0.34 nm or smaller. More specifically, examples of the carbon material may include pyrolytic carbons, cokes, glassy carbon fiber, an organic polymer compound fired body, activated carbon, and carbon blacks. Out of the above materials, the cokes may encompass pitch coke, needle coke, petroleum coke, etc. The organic polymer compound fired body is obtained by firing phenol resin, furan resin, or the like at an appropriate temperature to carbonize the material. The shape of the carbon material may be one or more of a fibrous shape, a spherical shape, a granular shape, and a scale-like shape.

Other than the above, the other active material may be one or more of metal oxides and polymer compounds. Examples of the metal oxides may include iron oxide, ruthenium oxide, and molybdenum oxide. Examples of the polymer compound may include polyacetylene, polyaniline, and polypyrrole.

It is to be noted that the other active material may have a configuration similar to the configuration of the active material 100 described above except that the material for forming the center portion 101 is different therefrom. The center portion 101 in this case may include one or more of the carbon materials etc. described as "other active material", for example.

The active material layer 2 may be formed, for example, by a coating method, a firing method (sintering method), or both. The coating method may be a method in which, for example, after the active material is mixed with the binder and/or the like, the mixture is dispersed in a solvent such as an organic solvent, and the resultant is applied. The firing method may be, for example, a method in which, after the application is performed by a procedure similar to the procedure in the coating method, a heat process is performed at a temperature higher than a melting point of the binder and/or the like. As the firing method, a publicly-known technique such as an atmosphere firing method, a reactive firing method, and a hot press firing method may be used.

[1-2. Method of Manufacturing Active Material and Electrode]

The electrode that uses this active material may be manufactured by the following two types of procedures, for example. The detailed description for the materials for forming the current collector 1 and the active material layer 2 has been already provided, and is therefore omitted below. It is to be noted that a method of manufacturing the active material of an embodiment of the present technology is described together below.

In the first procedure, first, sol solution including the fibrous carbon materials, and the center portion 101 are prepared.

A solvent of the sol solution is not particularly limited, but may be water or the like, for example. A method of preparing the sol solution is not particularly limited, but may be one or more of a bead mill, a ball mill, a homogenizer, a ultrasonic homogenizer, a high-pressure homogenizer, and the like, for example. It is to be noted that the sol solution may include one or more of additives such as a dispersant, for example. A content of the dispersant is not particularly limited. However, the content of the dispersant may be preferably 30 wt % or less with respect to the content of the fibrous carbon materials for example, because the content of the fibrous carbon materials is secured thereby, which ensures a function of the fibrous carbon materials.

When preparing the fibrous carbon materials, the fibrous carbon materials may be subjected to a cutting process on an as-necessary basis in order to adjust the short fiber rate, etc. An apparatus used for the cutting process may be one or more of a bead mill, a planetary ball mill, and the like, for example. It is to be noted that, in a case where the fibrous carbon materials that has been graphitized by a heat process are used, it may be preferable, for example, to cause the fibrous carbon materials to be less damaged in the cutting process in order to maintain the graphitized structure. In accordance therewith, a small amount of organic solvent may be added as a pulverization aid to the fibrous carbon materials, the fibrous carbon materials may be embedded in a resin, a saccharide, or the like, or the fibrous carbon materials may be cooled down with the use of liquid nitrogen or the like, when performing the cutting process, for example.

When preparing the center portion 101 (FIG. 2) that is a single granular body, particles (powder) having a desired composition are obtained by one or more of methods such as a gas atomization method, a water atomization method, and a fusion pulverization method, for example. On the other hand, when preparing the center portion 101 (FIG. 3) that is a composite granular body, the particulate (powder-like) inner portion 101A having a desired composition is obtained by one or more of methods such as a gas atomization method, a water atomization method, and a fusion pulverization method, for example. Thereafter, the outer portion 101B having a desired composition may be formed on the surface of the inner portion 101A by one or more of methods (vapor-phase deposition methods) such as a vapor deposition method and a sputtering method, for example.

In this case, the intermediate portion 103 (FIG. 4) may be formed on the surface of the center portion 101 by one or more of methods such as a vapor-phase deposition method and a wet coating method. The vapor-phase deposition method may be one or more of methods such as a vapor deposition method, a sputtering method, a pyrolytic chemical vapor deposition (CVD) method, a pyrolytic CVD method, an electron beam deposition method, and a saccharide carbonization method. In particular, the pyrolytic CVD method may be preferable, because the intermediate portion 103 is likely to be formed to have a uniform thickness.

Subsequently, the sol solution including the fibrous carbon materials 104 is supplied onto the surface of the center portion 101 to bring the sol solution into contact with the center portion 101. Accordingly, the fibrous carbon materials 104 are brought into contact with the surface of the center portion 101 in a state of being dispersed in the sol solution. A method of supplying the sol solution is not particularly limited. For example, the sol solution may be applied onto the surface of the center portion 101, or the center portion 101 may be dipped into the sol solution and then taken out therefrom. Further, concentration of the sol solution is not particularly limited. However, the concentration of the sol solution may be preferably as high as possible, because probability that the fibrous carbon materials 104 are in contact with the center portion 101 is increased thereby, which makes it easier for the fibrous carbon materials to extend in the direction along the surface of the center portion 101 and to be closely attached to the center portion 101.

Subsequently, the sol solution supplied onto the surface of the center portion 101 is heated. Due to this heat process, the fibrous carbon materials 104 extend in the direction along the surface of the center portion 101 and are closely attached to the center portion 101, which causes the covering portion 102 including the fibrous carbon materials 104 to be formed on the surface of the center portion 101. It is to be noted that conditions such as a heating temperature and heating time may be arbitrary. Thus, the active material 100 is obtained.

One reason why the sol solution is used for forming the covering portion 102 is because, unlike in a case where non-sol solution is used, the fibrous carbon materials 104 are made easier to extend in the direction along the surface of the center portion 101 and are made easier to be closely attached to the center portion 101. In detail, when the non-sol solution is used, the fibrous carbon materials 104 do not extend in the direction along the surface of the center portion 101, and the fibrous carbon materials 104 may be aggregated with one another mainly in a gap between the active materials 100 or the like. In contrast, when the sol solution is used, the fibrous carbon materials 104 extend in the direction along the surface of the center portion 101, and are closely attached to the center portion 101.

Subsequently, the active material 100 is mixed with other materials such as the binder to obtain an electrode mixture. Thereafter, the electrode mixture is dissolved or dispersed into a solvent to obtain electrode mixture slurry. Lastly, after the electrode mixture slurry is applied onto the surface of the current collector 1, the applied electrode mixture slurry is heated (dried) to form the active material layer 2. Thereafter, the active material layer 2 may be compression-molded or may be heated (fired).

In the second procedure, first, the sol solution including the fibrous carbon materials, and the center portion 101 are prepared by a procedure similar to that in the first procedure described above.

Subsequently, the center portion 101, the sol solution, and other materials such as the binder are mixed to obtain an electrode mixture. In this mixing process, the fibrous carbon materials 104 are brought into contact with the surface of the center portion 101 in a state of being dispersed into the sol solution in a manner similar to that in the case of using the first procedure.

Subsequently, the electrode mixture is dissolved or dispersed into a solvent to obtain electrode mixture slurry. Lastly, the electrode mixture slurry is applied onto the surface of the current collector 1, and the applied electrode mixture slurry is heated (dried) to form the active material layer 2. Due to this heat process, the fibrous carbon materials 104 extend in the direction along the surface of the center portion 101, and are closely attached to the center portion 101, as in the first procedure. Accordingly, the covering portion 102 including the fibrous carbon materials 104 is formed on the surface of the center portion 101. Thus, the active material 100 is obtained. Thereafter, the active material layer 2 may be compression-molded or heated (fired).

[Functions and Effects of Electrode Using Active Material]

According to the electrode using the active material described above, the covering portion 102 that includes the fibrous carbon materials 104 is provided on the center portion 101 that includes silicon and/or the like as constituent elements. Part or all of the fibrous carbon materials 104 extend in the direction along the surface of the center portion 101, and are closely attached to the center portion 101. Hence, the center portion 101 is physically and chemically protected by the covering portion 102 that is firmly and closely attached thereto as described above. As a result, degradation of the active material 100 and the decomposition reaction of the electrolytic solution are suppressed, and the electric conductivity of the active material 100 is improved. Accordingly, it is possible to contribute to improvement in performance of an electrochemical device using an electrode.

In particular, a higher effect is achievable when the fibrous carbon materials 104 are tangled with one another. In this case, a further higher effect is achievable when the mesh structure 105 is formed of the fibrous carbon materials 104. It is to be noted that a higher effect is achievable also when the fibrous carbon materials 104 are cross-linked with one another between the active materials 100.

Moreover, according to the method of manufacturing the active material described above, because the sol solution including the fibrous carbon materials 104 is brought into contact with the center portion 101 including silicon and/or the like as constituent elements and then the sol solution is heated, the covering portion 102 is formed. Accordingly, as described above, the fibrous carbon materials 104 extend in the direction along the surface of the center portion 101 and are closely attached to the center portion 101 in the process of forming the covering portion 102. This allows the covering portion 102 that is firmly and closely attached to the center portion 101 to be formed easily and stably. Accordingly, it is possible to stably achieve the advantage derived from the covering portion 102 described above. Further, when water is used as the solvent of the sol solution, moisture control, solvent recovery, etc. become unnecessary, which makes it possible to simplify the process of manufacturing the electrode, to reduce cost thereof, and to reduce environment load.

Here, it can be considered that one reason why the covering portion 102 is allowed to be formed (the fibrous carbon materials 104 extend in the direction along the surface of the center portion 101 and are closely attached to the center portion 101) in the present technology is because the sol solution is used in the process of forming the covering portion 102. This is experimentally proven in Examples described later. In comparison, in the above-described prior art (Japanese Unexamined Patent Application Publication No. 2010-095797), surfaces of composite particles are covered with carbon nanotubes, but the carbon nanotubes are not tangled with one another while extending in a direction along the surfaces of the composite particles, because the carbon nanotubes are grown utilizing pyrolysis and carbonization of hydrocarbon gas with the use of a metal component in the composite particles as a catalyst. In this case, the carbon nanotubes should mainly extend radially in directions intersecting the surfaces of the composite particles. Therefore, the carbon nanotubes may be tangled with one another, but it cannot be considered that the carbon nanotubes extend in directions along the surfaces of the composite particles. In other words, the carbon nanotubes that have been grown with the use of the metal component in the composite particles as the catalyst cannot exist so that the entire carbon materials are attached to the surfaces of the composite particles. Accordingly, it cannot be considered that the covering portion 102 in the present technology is formed in the above-described prior art.

[2. Secondary Battery]

The active material and the electrode of the present technology described above may be used in an electrochemical device as follows, for example. Application examples of the active material and the electrode are described below specifically referring to secondary batteries as examples of the electrochemical device.

[2-1. Lithium Ion Secondary Battery (Cylindrical Type)]

FIGS. 11 and 12 each illustrate a cross-sectional configuration of a secondary battery. FIG. 13 schematically illustrates a planar configuration of a cathode 21 and an anode 22 illustrated in FIG. 12. It is to be noted that part of a spirally wound electrode body 20 illustrated in FIG. 11 is enlarged in FIG. 12.

[General Configuration of Secondary Battery]

The secondary battery described here is a lithium ion secondary battery in which a capacity of the anode 22 is obtained by insertion and extraction of lithium (lithium ion) as an electrode reactant, and is of a so-called cylindrical type.

In this secondary battery, as illustrated in FIG. 11, the spirally wound electrode body 20 and a pair of insulating plates 12 and 13 may be contained inside a battery can 11 having a hollow columnar shape, for example. In the spirally wound electrode body 20, for example, the cathode 21 and the anode 22 are laminated with a separator 23 in between and are spirally wound. Here, the active material and the electrode of the present technology may be applied to the anode 22, for example.

The battery can 11 may have, for example, a hollow structure in which one end of the battery can 11 is closed and the other end thereof is open. Also, the battery can 11 may be made, for example, of iron, aluminum, alloy thereof, and/or the like. The surface of the battery can 11 may be plated with nickel and/or the like. The pair of insulating plates 12 and 13 is arranged to sandwich the spirally wound electrode body 20 in between, and to extend perpendicularly to a spirally wound periphery surface of the spirally wound electrode body 20.

At the open end of the battery can 11, a battery cover 14, a safety valve mechanism 15, and a positive temperature coefficient device (PTC device) 16 are attached by being swaged with a gasket 17. Thereby, the battery can 11 is hermetically sealed. The battery cover 14 may be made, for example, of a material similar to the material of the battery can 11. The safety valve mechanism 15 and the PTC device 16 are provided inside the battery cover 14. The safety valve mechanism 15 is electrically connected to the battery cover 14 via the PTC device 16. In the safety valve mechanism 15, in the case where the internal pressure becomes a certain level or higher as a result of internal short circuit, external heating, or the like, a disk plate 15A inverts to cut electric connection between the battery cover 14 and the spirally wound electrode body 20. The PTC device 16 prevents abnormal heat generation resulting from a large current. As temperature rises, resistance of the PTC device 16 is increased accordingly. The gasket 17 may be made, for example, of an insulating material. The surface of the gasket 17 may be coated with asphalt.

In the center of the spirally wound electrode body 20, for example, a center pin 24 may be inserted. However, the center pin 24 may not be inserted. For example, a cathode lead 25 made of a conductive material such as aluminum may be connected to the cathode 21. For example, an anode lead 26 made of a conductive material such as nickel may be connected to the anode 22. For example, the cathode lead 25 may be welded to the safety valve mechanism 15, and may be electrically connected to the battery cover 14. For example, the anode lead 26 may be welded to the battery can 11, and may be electrically connected to the battery can 11 thereby.

[Cathode]

As illustrated in FIG. 12, the cathode 21 may have a cathode active material layer 21B on one surface or both surfaces of a cathode current collector 21A, for example. The cathode current collector 21A may be made, for example, of a conductive material such as aluminum, nickel, or stainless steel.

The cathode active material layer 21B includes, as a cathode active material, one or more of cathode materials capable of inserting and extracting a lithium ion. The cathode active material layer 21B may further include one or more of other materials such as a cathode binder and a cathode conductor. It is to be noted that the details of the cathode binder and the cathode conductor are similar to the details of the binder and the conductor that are used in the electrode of the present technology.

The cathode material may be preferably a lithium-containing compound, because high energy density is obtained thereby. Examples of the lithium-containing compound may include a lithium-transition-metal composite oxide and a lithium-transition-metal-phosphate compound. The lithium-transition-metal composite oxide is an oxide that includes Li and one or more transition metal elements as constituent elements. The lithium-transition-metal-phosphate compound is a phosphate compound that includes Li and one or more transition metal elements as constituent elements. In particular, the transition metal elements may be preferably one or more of cobalt, nickel, manganese, iron, and the like, because a higher voltage is achieved thereby. The chemical formula thereof may be expressed, for example, as $Li_xM1O_2$ or $Li_yM2PO_4$. In the formulas, M1 and M2 are one or more transition metal elements. Values of x and y vary according to the charge and discharge state, but may be in the range of $0.05 \leq x \leq 1.10$ and $0.05 \leq y \leq 1.10$, for example.

Examples of the lithium-transition-metal composite oxide may include $LiCoO_2$, $LiNiO_2$, and a lithium-nickel-based composite oxide represented by Formula (1) below. Examples of the lithium-transition-metal-phosphate compound may include $LiFePO_4$ and $LiFe_{1-u}Mn_uPO_4$ (u<1), because a high battery capacity is thereby achieved and superior cycle characteristics, etc. are also achieved.

$$LiNi_{1-z}M_zO_2 \qquad (1)$$

(M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb. z satisfies 0.005<z<0.5.)

Other than the above, the cathode material may be, for example, one or more of an oxide, a disulfide, a chalcogenide, a conductive polymer, and the like. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. However, the cathode material is not limited to the series of materials described above, and may be other material.

[Anode]

The anode 22 has a configuration similar to the configuration of the electrode of the present technology. Specifically, as illustrated in FIG. 12, the anode 22 may have an anode active material layer 22B on one surface or both surfaces of an anode current collector 22A, for example. Configurations of the anode current collector 22A and the anode active material layer 22B may be similar to the configurations of the current collector 1 and the active material layer 2, respectively.

In this secondary battery, in order to prevent lithium metal from being unintentionally precipitated on the anode 22 in the middle of charge, the electrochemical equivalent of the anode material capable of inserting and extracting a lithium ion may be preferably larger than the electrochemical equivalent of the cathode. Further, in a case where the open circuit voltage (that is, a battery voltage) at the time of completely-charged state is equal to or higher than 4.25 V, the extraction amount of lithium ions per unit mass is larger than that in a case where the open circuit voltage is 4.20 V even if the same cathode active material is used. Therefore, amounts of the cathode active material and the anode active material are adjusted accordingly. High energy density is thereby achievable.

Here, as illustrated in FIG. 13, the cathode active material layer 21B may be provided on part (a middle region in a longitudinal direction, for example) of the surface of the cathode current collector 21A, for example. In contrast, the anode active material layer 22B may be provided on the entire surface of the anode current collector 22A, for example. Accordingly, the anode active material layer 22B may be provided in a region (opposing region R1) opposing the cathode active material layer 21B and a region (non-opposing region R2) not opposing the cathode active material layer 21B, of the anode current collector 22A. In this case, out of the anode active material layer 22B, a portion provided in the opposing region R1 contributes to charge and discharge, but a portion provided in the non-opposing region R2 contributes little to charge and discharge. It is to be noted that the cathode active material layer 21B and the anode active material layer 22B are hatched in FIG. 13.

As described above, the anode active material included in the anode active material layer 22B includes the plurality of fibrous carbon materials, and the mesh structure may be formed of the fibrous carbon materials in some cases. In this case, the anode active material layer 22B may be deformed or damaged because of expansion and contraction at the time of charge and discharge. The configuration (such as a state of the fibrous carbon materials) of the anode active materials may be therefore changed from a state thereof at the time of formation of the anode active material layer 22B. However, the formation state of the anode active material layer 22B is almost maintained without being influenced by charge and discharge in the non-opposing region R2. Accordingly, it may be preferable to examine the anode active material layer 22B in the non-opposing region R2, for the configuration of the anode active material, because it is possible to examine the configuration of the anode active material accurately with favorable reproducibility, irrespective of history of charge and discharge (such as whether charge or discharge has been performed and the number of charge and discharge).

[Separator]

The separator 23 separates the cathode 21 from the anode 22, and allows lithium ions to pass therethrough while preventing current short circuit resulting from contact of the both electrodes. The separator 23 may be, for example, a porous film made of synthetic resin, ceramics, or the like. The separator 23 may be a laminated film in which two or more porous films are laminated. Examples of the synthetic resin may include polytetrafluoroethylene, polypropylene, and polyethylene.

[Electrolytic Solution]

The separator 23 may be impregnated with electrolytic solution that is a liquid electrolyte. The electrolytic solution may include a solvent and an electrolyte salt. It is to be noted that the electrolytic solution may include one or more of other materials such as an additive.

The solvent may include one or more of non-aqueous solvents such as organic solvents. Examples of the non-aqueous solvent may include cyclic ester carbonate, chain ester carbonate, lactone, chain carboxylic ester, and nitrile, because superior battery capacity, cycle characteristics, conservation characteristics, etc. are obtained thereby. Examples of the cyclic ester carbonate may include ethylene carbonate, propylene carbonate, and butylene carbonate. Examples of the chain ester carbonate may include dimethyl carbonate, diethyl carbonate, ethyl methyl carbonate, and methyl propyl carbonate. Examples of the lactone may include γ-butyrolactone and γ-valerolactone. Examples of the carboxylic ester may include methyl acetate, ethyl acetate, methyl propionate, ethyl propionate, methyl butyrate, methyl isobutyrate, methyl trimethylacetate, and ethyl trimethylacetate. Examples of the nitrile may include acetonitrile, glutaronitrile, adiponitrile, methoxyacetonitrile, and 3-methoxypropionitrile.

Other than the above, the non-aqueous solvent may be, for example, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide, or the like because a similar advantage is achieved thereby.

In particular, one or more of ethylene carbonate, propylene carbonate, dimethyl carbonate, diethyl carbonate, and ethyl methyl carbonate may be preferable, because further superior battery characteristics, cycle characteristics, conservation characteristics, etc. are achieved thereby. In this case, a combination of a high viscosity (high dielectric constant) solvent (for example, specific dielectric constant $\varepsilon \geq 30$) such as ethylene carbonate or propylene carbonate and a low viscosity solvent (for example, viscosity$\leq 1$ mPa·s) such as dimethyl carbonate, ethyl methyl carbonate, or diethyl carbonate may be more preferable. One reason for this is because the dissociation characteristics of the electrolyte salt and ion mobility are improved thereby.

In particular, the solvent may include one or more of unsaturated cyclic ester carbonate, halogenated ester carbonate, sultone (cyclic sulfonic ester), acid anhydride, and the like, because chemical stability of the electrolytic solution is improved thereby. The unsaturated cyclic ester carbonate is cyclic ester carbonate including one or more unsaturated bonds (carbon-carbon double bonds). Examples of the unsaturated cyclic ester carbonate may include vinylene carbonate, vinylethylene carbonate, and methyleneethylene carbonate. The halogenated ester carbonate is cyclic or chain ester carbonate having one or more halogens as constituent elements. Examples of the cyclic halogenated ester carbonate may include 4-fluoro-1,3-dioxolane-2-one and 4,5-difluoro-1,3-dioxolane-2-one. Examples of the chain halogenated ester carbonate may include fluoromethyl methyl carbonate, bis(fluoromethyl) carbonate, and difluoromethyl methyl carbonate. Examples of the sultone may include propane sultone and propene sultone. Examples of examples of the acid anhydride may include succinic anhydride, ethane disulfonic anhydride, and sulfobenzoic anhydride.

The electrolyte salt may include, for example, one or more of salts such as lithium salt. However, the electrolyte salt may include, for example, salt other than the lithium salt. Examples of "salt other than the lithium salt" may include light metal salt other than lithium salt.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), because superior battery capacity, cycle characteristics, conservation characteristics, and the like are thereby achieved. It is to be noted that specific examples of the lithium salt are not limited to the compounds described above.

In particular, one or more of $LiPF_6$, $LiBF_4$, $LiClO_4$, and $LiAsF_6$ may be preferable, and $LiPF_6$ may be more preferable, because the internal resistance is thereby lowered, which results in achievement of a higher effect.

A content of the electrolyte salt is not particularly limited, but in particular, may be preferably from 0.3 mol/kg to 3.0 mol/kg with respect to the solvent, because high ion conductivity is achieved thereby.

[Operation of Secondary Battery]

The secondary battery may operate, for example, as follows. At the time of charge, lithium ions extracted from the cathode 21 may be inserted in the anode 22 through the electrolytic solution. On the other hand, at the time of discharge, lithium ions extracted from the anode 22 may be inserted in the cathode 21 through the electrolytic solution.

[Method of Manufacturing Secondary Battery]

The secondary battery may be manufactured by the following procedure, for example.

First, the cathode 21 is fabricated. The cathode active material is mixed with the cathode binder and/or the like on an as-necessary basis to obtain a cathode mixture. Subsequently, the cathode mixture is dispersed in an organic solvent or the like to obtain paste cathode mixture slurry. Subsequently, both surfaces of the cathode current collector 21A are coated with the cathode mixture slurry, which is dried to form the cathode active material layers 21B. Thereafter, the cathode active material layers 21B may be compression-molded with the use of a roll pressing machine and/or the like. In the case where this cathode active material layer 21B is formed, the cathode active material layer 21B may be compression-molded while being heated, or compression molding may be performed repeatedly for a plurality of times.

Further, the anode active material layers 22B are formed on both surfaces of the anode current collector 22A by a procedure similar to the procedure for the electrode of the present technology, and the anode 22 is fabricated thereby.

Lastly, the secondary battery is assembled using the cathode 21 and the anode 22. The cathode lead 25 is attached to the cathode current collector 21A by a welding method and/or the like, and the anode lead 26 is attached to the anode current collector 22A by a welding method and/or the like. Subsequently, the cathode 21 and the anode 22 are laminated with the separator 23 in between and are spirally wound, and the spirally wound electrode body 20 is thereby fabricated. Thereafter, the center pin 24 is inserted in the center of the spirally wound electrode body. Subsequently, the spirally wound electrode body 20 is sandwiched between the pair of insulating plates 12 and 13, and is contained inside the battery can 11. In this case, the end tip of the cathode lead 25 is attached to the safety valve mechanism 15 by a welding method and/or the like, and the end tip of the anode lead 26 is attached to the battery can 11 by a welding method and/or the like. Subsequently, the electrolytic solution in which the electrolyte salt is dispersed in the solvent is injected inside the battery can 11, and the separator 23 is impregnated with the electrolytic solution. Subsequently, at the open end of the battery can 11, the battery cover 14, the safety valve mechanism 15, and the PTC device 16 are swaged with the gasket 17.

[Functions and Effects of Secondary Battery]

According to the cylindrical-type secondary battery, the anode 22 has a configuration similar to the configuration of the electrode of the present technology. This suppresses degradation of the anode active material and the decomposition reaction of the electrolytic solution, and improves electric conductivity of the anode active material. As a result, the discharge capacity is made less likely to be decreased even when charge and discharge are performed repeatedly, and superior battery characteristics are therefore achieved. Functions and effects other than the above are similar to the functions and effects of the active material, the electrode, etc. of the present technology.

[2-2. Lithium Ion Secondary Battery (Laminated Film Type)]

FIG. 14 illustrates an exploded perspective configuration of another secondary battery. FIG. 15 enlarges a cross-section taken along a line XV-XV of a spirally wound electrode body 30 illustrated in FIG. 14. The components of the cylindrical-type secondary battery that has been already described are referred to below where appropriate.

[General Configuration of Secondary Battery]

The secondary battery described here is a lithium ion secondary battery of a so-called laminated film type. As illustrated in FIG. 14, a spirally wound electrode body 30 may be contained inside a film-like outer package member 40, for example. In the spirally wound electrode body 30, for example, a cathode 33 and an anode 34 may be laminated with a separator 35 and an electrolyte layer 36 in between and may be spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be made, for example, of a conductive material such as aluminum, and the anode lead 32 may be made, for example, of a conducive material such as copper, nickel, and stainless steel. These conductive materials may be in the shape, for example, of a thin plate or mesh.

The outer package member 40 may be, for example, a laminated film in which a fusion bonding layer, a metal layer, and a surface protective layer are laminated in this order. In such an outer package member 40, the two laminated films are overlapped with each other so that the fusion bonding layers are opposed to the spirally wound electrode body 30, and thereafter, outer edges of the respective fusion bonding layers are fusion bonded to each other. However, the two laminated films may be bonded to each other by an adhesive, or the like. Examples of the fusion bonding layer may include a film made of polyethylene, polypropylene, and/or the like. Examples of the metal layer may include an aluminum foil. Examples of the surface protective layer may include a film made of nylon, polyethylene terephthalate, and/or the like.

In particular, the outer package member 40 may be preferably an aluminum laminated film in which a polyethylene film, an aluminum foil, and a nylon film are laminated in this order. However, the outer package member 40 may be a laminated film having other laminated structure, a polymer film such as polypropylene, or a metal film.

For example, a close-attachment film 41 may be inserted between the outer package member 40 and the cathode lead 31 and between the outer package member 40 and the anode lead 32 in order to prevent outside air intrusion. The close-attachment film 41 is made of a material having close-attachment characteristics with respect to the cathode lead 31 and the anode lead 32. Examples of the material having close-attachment characteristics may include polyolefin resin. More specific examples thereof may include polyethylene, polypropylene, modified polyethylene, and modified polypropylene.

As illustrated in FIGS. 13 and 15, the cathode 33 may have, a cathode active material layer 33B on one surface or both surfaces of a cathode current collector 33A, for example, and the anode 34 may have an anode active material layer 34B on one surface or both surfaces of an anode current collector 34A, for example. The configurations of the cathode current collector 33A, the cathode active material layer 33B, the anode current collector 34A, and the anode active material layer 34B may be similar to the configurations of the cathode current collector 21A, the cathode active material layer 21B, the anode current collector 22A, and the anode active material layer 22B, respectively. Also, the configuration of the separator 35 may be similar to the configuration of the separator 23.

The electrolyte layer 36 includes a polymer compound and electrolytic solution that is held by the polymer compound. The electrolyte layer 36 is a so-called gel electrolyte, because thereby, high ion conductivity (for example, 1 mS/cm or higher at room temperature) is achieved and liquid leakage of the electrolytic solution is prevented. The electrolyte layer 36 may include other material such as an additive on an as-necessary basis.

The polymer compound may be, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, a copolymer of vinylidene fluoride and hexafluoropyrene, and the like. In particular, polyvinylidene fluoride or the copolymer of vinylidene fluoride and hexafluoropyrene may be preferable, and polyvinylidene fluoride may be more preferable, because such a polymer compound is electrochemically stable.

For example, the configuration of the electrolytic solution may be similar to the configuration of the electrolytic solution in the case of the cylindrical-type. It is to be noted that, in the electrolyte layer 36 that is a gel electrolyte, "solvent" of the electrolytic solution refers to a wide concept including not only a liquid solvent but also a material having ion conductivity capable of dissociating the electrolyte salt. Therefore, in a case where a polymer compound having ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

The secondary battery may operate, for example, as follows. At the time of charge, lithium ions extracted from the cathode 33 may be inserted in the anode 34 through the electrolyte layer 36. On the other hand, at the time of discharge, lithium ions extracted from the anode 34 may be inserted in the cathode 33 through the electrolyte layer 36.

[Method of Manufacturing Secondary Battery]

The secondary battery including the gel electrolyte layer 36 may be manufactured, for example, by the following three kinds of procedures.

In the first procedure, the cathode 33 and the anode 34 are fabricated by a fabrication procedure similar to that of the cathode 21 and the anode 22. Specifically, the cathode 33 is fabricated by forming the cathode active material layers 33B on both surfaces of the cathode current collector 33A, and the anode 34 is fabricated by forming the anode active material layers 34B on both surfaces of the anode current collector 34A. Subsequently, precursor solution including electrolytic solution, a polymer compound, and a solvent such as an organic solvent is prepared. Thereafter, the precursor solution is applied onto the cathode 33 and the anode 34 to form the gel electrolyte layer 36. Subsequently, the cathode lead 31 is attached to the cathode current collector 33A by a welding method and/or the like, and the anode lead 32 is attached to the anode current collector 34A by a welding method and/or the like. Subsequently, the cathode 33 and the anode 34 are laminated with the separator 35 in between and are spirally wound to fabricate the spirally wound electrode body 30. Thereafter, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method and/or the like to enclose the spirally wound electrode body 30 inside the outer package members 40. In this case, the close-attachment films 41 are inserted between the cathode lead 31 and the outer package member 40 and between the anode lead 32 and the outer package member 40.

In the second procedure, the cathode lead 31 is attached to the cathode 33, and the anode lead 52 is attached to the anode 34. Subsequently, the cathode 33 and the anode 34 are laminated with the separator 35 in between and are spirally wound to fabricate a spirally wound body as a precursor of the spirally wound electrode body 30. Thereafter, the protective tape 37 is adhered to the outermost periphery thereof. Subsequently, after the spirally wound body is arranged between two pieces of the film-like outer package members 40, the outermost peripheries except for that on one side are bonded by a thermal fusion bonding method and/or the like, and the spirally wound body is contained inside the pouch-like outer package member 40. Subsequently, electrolytic solution, monomers as a raw material for the polymer compound, a polymerization initiator, and, on an as-necessary basis, other materials such as a polymerization inhibitor are mixed to prepare a composition for electrolyte. Subsequently, the composition for electrolyte is injected inside the pouch-like outer package member 40. Thereafter, the outer package member 40 is hermetically sealed by a thermal fusion bonding method and/or the like. Subsequently, the monomers are thermally polymerized, and thereby, a polymer compound is formed. Thereby, the polymer compound is impregnated with the electrolytic solution, and the polymer compound is gelated. Thus, the gel electrolyte layer 36 is formed.

In the third procedure, the spirally wound body is fabricated and contained in the pouch-like outer package member 40 in a manner similar to that of the foregoing second procedure, except that the separator 35 with both surfaces coated with a polymer compound is used. Examples of the polymer compound with which the separator 35 is coated may include a polymer (a homopolymer, a copolymer, or a multicomponent copolymer) containing vinylidene fluoride as a component. Specifically, the homopolymer may be polyvinylidene fluoride. The copolymer may be a binary copolymer containing vinylidene fluoride and hexafluoropropylene as components, for example. The multicomponent copolymer may be a ternary copolymer containing vinylidene fluoride, hexafluoropropylene, and chlorotrifluoroethylene as components, for example. It is to be noted that, together with the polymer containing vinylidene fluoride as a component, other one or more polymer compounds may be used. Subsequently, electrolytic solution is prepared and injected inside the outer package member 40. Thereafter, the opening of the outer package member 40 is hermetically sealed by a thermal fusion bonding method and/or the like. Subsequently, the resultant is heated while a weight is applied to the outer package member 40, and the separator 35 is closely attached to the cathode 33 and the anode 34 with the polymer compound in between. Thereby, the polymer compound is impregnated with the electrolytic solution, the polymer compound is gelated, and accordingly, the electrolyte layer 36 is formed.

In the third procedure, swollenness of the secondary battery is suppressed more than in the first procedure. Further, in the third procedure, little of the monomer as a raw material of the polymer compound, the solvent, and the like are left in the electrolyte layer 36, compared to in the second procedure. Therefore, the formation step of the polymer compound is favorably controlled. Therefore, the cathode 33, the anode 34, and the separator 35 are sufficiently and closely attached to the electrolyte layer 36.

[Functions and Effects of Secondary Battery]

According to the laminated-film-type secondary battery, the anode 34 has a configuration similar to the configuration of the present technology. As a result, superior battery characteristics are achieved for reasons similar to the reasons for the cylindrical-type secondary battery. Functions and effects other than the above are similar to the functions and effects in the case of the cylindrical type.

[3. Applications of Secondary Battery]

Next, application examples of the secondary battery described above are described.

Applications of the secondary battery are not particularly limited as long as the secondary battery is applied to a machine, a device, an instrument, an apparatus, a system (collective entity of a plurality of devices and the like), or the like that is allowed to use the secondary battery as a driving electric power source, an electric power storage source for electric power accumulation, or the like. It is to be noted that the secondary battery used as an electric power source may be a main electric power source (an electric power source used preferentially), or may be an auxiliary electric power source (an electric power source used instead of a main electric power source or used being switched from the main electric power source). In a case where the secondary battery is used as the auxiliary electric power source, the kind of the main electric power source is not limited to the secondary battery.

Examples of applications of the secondary battery may be the followings. Examples thereof include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include a mobile lifestyle appliance such as an electric shaver; a storage device such as a backup electric power source and a memory card; an electric power tool such as an electric drill and an electric saw; a battery pack for a notebook personal computer or the like used as an attachable and detachable electric power source; a medical electronic apparatus such as a pacemaker and a hearing aid; an electric vehicle such as an electric automobile (including a hybrid automobile); and an electric power storage system such as a home battery system for accumulating electric power for emergency or the like. It goes without saying that an application other than the foregoing applications may be adopted.

In particular, the secondary battery is effectively applicable to the battery pack, the electric vehicle, the electric power storage system, the electric power tool, the electronic apparatus, etc. One reason for this is because, since superior battery characteristics are demanded, performance is effectively improved with the use of the secondary battery of the present technology. It is to be noted that the battery pack is an electric power source using secondary batteries, and is a so-called assembled battery or the like. The electric vehicle is a vehicle that works (runs) with the use of a secondary battery as a driving electric power source. As described above, the electric vehicle may be an automobile (such as a hybrid automobile) including a driving source other than a secondary battery. The electric power storage system is a system using a secondary battery as an electric power storage source. For example, in a home electric power storage system, electric power is accumulated in the secondary battery as an electric power storage source and the accumulated electric power is used on an as-necessary basis, and therefore, home electric products and the like become usable. The electric power tool is a tool in which a movable section (such as a drill) is moved with the use of a secondary battery as a driving electric power source. The electronic apparatus is an apparatus executing various functions with the use of a secondary battery as a driving electric power source (electric power supply source).

Here, description is specifically provided of some application examples of the secondary battery. It is to be noted that the configurations of the respective application examples described below are mere examples, and may be changed as appropriate.

[3-1. Battery Pack]

FIG. 16 illustrates a block configuration of a battery pack. For example, the battery pack may include a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60. The housing 60 may be made, for example, of a plastic material or the like.

The control section 61 controls operation of the whole battery pack (including a used state of the electric power source 62), and may include, for example, a central processing unit (CPU) and/or the like. The electric power source 62 includes one or more secondary batteries (not illustrated). The electric power source 62 may be, for example, an assembled battery including two or more secondary batteries. A connection type of the secondary batteries may be a series-connected type, may be a parallel-connected type, or may be a mixed type thereof. To give an example, the electric power source 62 may include six secondary batteries connected in a manner of dual-parallel and three-series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (all of which are not illustrated). The charge control switch and the discharge control switch may each be, for example, a semiconductor switch such as a field-effect transistor (MOSFET) using a metal oxide semiconductor.

The current measurement section 64 measures a current with the use of the current detection resistance 70, and outputs the measurement result to the control section 61. The temperature detection section 65 measures a temperature with the use of the temperature detection device 69, and outputs the measurement result to the control section 61. The temperature measurement result may be used, for example, for a case in which the control section 61 controls charge and discharge at the time of abnormal heat generation, a case in which the control section 61 performs a correction process at the time of calculating remaining capacity, etc. The voltage detection section 66 measures a voltage of the secondary battery in the electric power source 62, performs analog-to-digital conversion on the measured voltage, and supplies the resultant to the control section 61.

The switch control section 67 controls operations of the switch section 63 according to signals inputted from the current measurement section 64 and the voltage detection section 66.

The switch control section 67 may execute control so that a charge current is prevented from flowing in a current path of the electric power source 62 by disconnecting the switch section 63 (charge control switch) in a case where the battery voltage reaches an overcharge detection voltage, for example. Accordingly, in the electric power source 62, only discharge is allowed to be performed through the discharging diode. It is to be noted that, for example, in the case where a large current flows at the time of charge, the switch control section 67 blocks the charge current.

Further, the switch control section 67 may execute control so that a discharge current is prevented from flowing in the current path of the electric power source 62 by disconnecting the switch section 63 (discharge control switch) in a case where the battery voltage reaches an overdischarge detection voltage, for example. Accordingly, in the electric power source 62, only charge is allowed to be performed through the charging diode. It is to be noted that, for example, in the case where a large current flows at the time of discharge, the switch control section 67 blocks the discharge current.

It is to be noted that, in the secondary battery the overcharge detection voltage may be 4.20 V±0.05 V and the overdischarge detection voltage may be 2.4 V±0.1 V, for example.

The memory 68 may be, for example, an EEPROM as a non-volatile memory, or the like. The memory 68 may store, for example, numerical values calculated by the control section 61, information of the secondary battery measured in a manufacturing step (such as an internal resistance in the initial state), etc. It is to be noted that, in the case where the memory 68 stores full charge capacity of the secondary battery, the control section 61 is allowed to comprehend information such as remaining capacity.

The temperature detection device 69 measures a temperature of the electric power source 62, and outputs the measurement result to the control section 61. The temperature detection device 69 may be, for example, a thermistor or the like.

The cathode terminal 71 and the anode terminal 72 are terminals connected to an external device (such as a notebook personal computer) driven with the use of the battery pack, an external device (such as a battery charger) used for charging the battery pack, etc. The electric power source 62 is charged and discharged through the cathode terminal 71 and the anode terminal 72.

[3-2. Electric Vehicle]

FIG. 17 illustrates a block configuration of a hybrid automobile as an example of electric vehicles. For example, the electric vehicle may include a control section 74, an engine 75, an electric power source 76, a driving motor 77, a differential 78, an electric generator 79, a transmission 80, a clutch 81, inverters 82 and 83, and various sensors 84, inside a housing 73 made of metal. In addition thereto, the electric vehicle may include a front drive shaft 85 and a front tire 86 that are connected to the differential 78 and the transmission 80, and may include a rear drive shaft 87 and a rear tire 88, for example.

The electric vehicle is allowed to run with the use of one of the engine 75 and the motor 77 as a drive source. The engine 75 is a main power source, and may be, for example, a petrol engine. In the case where the engine 75 is used as a power source, drive power (torque) of the engine 75 may be transferred to the front tire 86 or the rear tire 88 through the differential 78, the transmission 80, and the clutch 81 as drive sections, for example. It is to be noted that the torque of the engine 75 may also be transferred to the electric generator 79. With the use of the torque, the electric generator 79 generates alternating-current electric power. Also, the generated alternating-current electric power is converted into direct-current electric power through the inverter 83, and the converted power is accumulated in the electric power source 76. On the other hand, in the case where the motor 77 that is a conversion section is used as a power source, electric power (direct-current electric power) supplied from the electric power source 76 is converted into alternating-current electric power through the inverter 82. The motor 77 is driven with the use of the alternating-current electric power. Drive power (torque) obtained by converting the electric power by the motor 77 may be transferred to the front tire 86 or the rear tire 88 through the differential 78, the transmission 80, and the clutch 81 that are the drive sections, for example.

It is to be noted that, when speed of the electric vehicle is reduced through an unillustrated brake mechanism, the resistance at the time of speed reduction is transferred to the motor 77 as torque, and the motor 77 may be configured to generate alternating-current electric power with the use of the torque. It may be preferable that the alternating-current electric power be converted into direct-current electric power through the inverter 82, and the direct-current regenerative electric power be accumulated in the electric power source 76.

The control section 74 controls operations of the whole electric vehicle, and, for example, may include a CPU and/or the like. The electric power source 76 includes one or more secondary batteries (not illustrated). The electric power source 76 may be connected to an external electric power source, and electric power may be accumulated by receiving the electric power supply from the external electric power source. The various sensors 84 may be used, for example, for controlling the number of revolutions of the engine 75 or for controlling an opening level (a throttle opening level) of an unillustrated throttle valve. The various sensors 84 may include, for example, a speed sensor, an acceleration sensor, an engine frequency sensor, and/or the like.

It is to be noted that the description has been given above of the case where the electric vehicle is a hybrid automobile. However, examples of the electric vehicles may include a vehicle (electric automobile) that operates with the use of only the electric power source 76 and the motor 77 without using the engine 75.

[3-3. Electric Power Storage System]

FIG. 18 illustrates a block configuration of an electric power storage system. For example, the electric power storage system may include a control section 90, an electric power source 91, a smart meter 92, and a power hub 93, inside a house 89 such as a general residence or a commercial building.

In this case, the electric power source 91 may be connected to, for example, an electric device 94 provided inside the house 89, and may be connectable to an electric vehicle 96 parked outside the house 89. Further, for example, the electric power source 91 may be connected to a private power generator 95 provided in the house 89 through the power hub 93, and may be connectable to an external concentrating electric power system 97 through the smart meter 92 and the power hub 93.

It is to be noted that the electric device 94 may include, for example, one or more home electric appliances. Examples of the home electric appliance may include a refrigerator, an air conditioner, a television, and a water heater. The private power generator 95 may be, for example, one or more of a solar power generator, a wind-power generator, and the like. The electric vehicle 96 may be, for example, one or more of an electric automobile, an electric motorcycle, a hybrid automobile, and the like. The concentrating electric power system 97 may be, for example, one or more of a thermal power plant, an atomic power plant, a hydraulic power plant, a wind-power plant, and the like.

The control section 90 controls an operation of the whole electric power storage system (including a used state of the electric power source 91), and, for example, may include a CPU and/or the like. The electric power source 91 includes one or more secondary batteries (not illustrated). The smart meter 92 may be, for example, an electric power meter, compatible with a network, provided in the house 89 demanding electric power, and may be communicable with an electric power supplier. In accordance therewith, for example, while the smart meter 92 communicates with outside on an as-necessary basis, the smart meter 92 may control the balance between supply and demand in the house 89, and thereby allows effective and stable energy supply to be achieved.

In the electric power storage system, for example, electric power may be accumulated in the electric power source 90 from the concentrating electric power system 97 that is an external electric power source through the smart meter 92 and the power hub 93, and electric power may be accumulated in the electric power source 91 from the private power generator 95 that is an independent electric power source through the power hub 93. The electric power accumulated in the electric power source 91 is supplied to the electric device 94 or the electric vehicle 96 on an as-necessary basis according to an instruction of the control section 90. Therefore, the electric device 94 becomes operable, and the electric vehicle 96 becomes chargeable. That is, the electric power storage system is a system capable of accumulating and supplying electric power in the house 89 with the use of the electric power source 91.

The electric power accumulated in the electric power source 91 is arbitrarily usable. Therefore, for example, electric power is allowed to be accumulated in the electric power source 91 from the concentrating electric power system 97 in the middle of the night when an amount of use of electricity is inexpensive, and the electric power accumulated in the electric power source 91 is allowed to be used during daytime hours when an electric rate is expensive.

It is to be noted that the foregoing electric power storage system may be provided for each household (family unit), or may be provided for a plurality of households (family units).

[3-4. Electric Power Tool]

FIG. 19 illustrates a block configuration of an electric power tool. For example, the electric power tool may be an electric drill, and may include a control section 99 and an electric power source 100 inside a tool body 98 made of a plastic material and/or the like. For example, a drill section 101 that is a movable section may be attached to the tool body 98 in an operable (rotatable) manner.

The control section 99 controls an operation of the whole electric power tool (including a used state of the electric power source 100), and may include, for example, a CPU and/or the like. The electric power source 100 includes one or more secondary batteries (not illustrated). The control section 99 allows electric power to be supplied from the electric power source 100 to the drill section 101 to cause the drill section 101 to be operable on an as-necessary basis according to an operation of an unillustrated operation switch.

Examples

Examples of the present technology are described in detail.

Examples 1-1 to 1-3

Coin-type secondary batteries (lithium ion secondary batteries) illustrated in FIG. 20 were fabricated by the following procedure.

When fabricating a counter electrode 53, first, 91 parts by mass of the cathode active material ($LiCoO_2$), 6 parts by mass of the cathode conductor (carbon black), and 3 parts by mass of the cathode binder (polyvinylidene fluoride (PVDF)) were mixed to obtain a cathode mixture. Subsequently, the cathode mixture was dispersed in the organic solvent (N-methyl-2-pyrrolidone (NMP)) to obtain paste cathode mixture slurry. Subsequently, the cathode mixture slurry was applied onto both surfaces of the cathode current collector (strip-like aluminum foil having a thickness of 12 μm) with the use of a coating apparatus. Thereafter, the applied cathode mixture slurry was dried to form the cathode active material layer. Lastly, the cathode active material layer was compression-molded with the use of a roll pressing machine, and the resultant was punched into a pellet-like shape (having a diameter of 16 mm). In this case, a thickness of the cathode active material layer was so adjusted that lithium metal was not precipitated on the counter electrode 53 at the time of full charge.

When fabricating a test electrode 51, first, the inner portion 101A being a simple substance of silicon (Si) was prepared. Thereafter, oxide of silicon (SiO) was deposited on the surface of the inner portion 101A by a powder deposition method to form the outer portion 101B. Thus, the center portion 101 including the inner portion 101A and the outer portion 101B was obtained. Subsequently, the carbon material (graphite: C) was deposited on the surface of the center portion 101 by a vapor deposition method to form the intermediate portion 103. Subsequently, the center portion 101 was dipped into the sol solution in which the carbon nanotubes (CNT) that were the fibrous carbon materials 104 were dispersed, and was taken out therefrom. Thereafter, the center portion 101 was heated (at 190 deg C. for 6 hours). Accordingly, the covering portion 102 including the fibrous carbon materials 104 was formed on the surface of the center portion 101, and the anode active material was therefore obtained.

The sol solution used here was aqueous dispersion of carbon nanofibers (MDCNF-D available from MD Nanotech Corporation). A solvent was water, and the fibrous carbon material 104 had dimensions that were a fiber diameter (minor axis) from about 10 nm to about 20 nm, a fiber length (major axis) from about 0.1 μm to about 10 μm, and pH of 2.8.

It is to be noted that non-sol solution was also used instead of the sol solution for comparison. A composition, etc. of the non-sol solution was similar to those of the sol solution except that the non-sol solution was not sol (was power-dispersed solution). Moreover, for comparison, the covering portion 102 was not formed, and the center portion 101 formed with the intermediate portion 103 was used as it was as the anode active material.

Here, surface analysis was performed on the fibrous carbon materials included in the sol solution and the non-sol solution by XPS. As a result, —OH and —COOH were detected in the sol solution, but no surface functional group was detected in the non-sol solution.

Subsequently, in the case where the covering portion 102 was formed, 70 parts by mass of the anode active material (center portion/intermediate portion/covering portion=Si/SiO/C), 12.5 parts by mass of the anode binder (15% aqueous solution of polyacrylic acid), 12.5 parts by mass of the anode conductor, and 5 parts by mass of the sol solution or the non-sol solution were mixed to obtain an anode mixture. The anode conductor was a mixture of 10 parts by mass of artificial graphite (KS6 available from TIMCAL Japan KK) and 2.5 parts by mass of Denka Black (HS100 available from Denki Kagaku Kogyo Kabushiki Kaisha). On the other hand, in the case where the covering portion 102 was not formed, the anode mixture was prepared by a procedure similar to the procedure in the case where the covering portion 102 was formed, except that a mixture ratio (mass ratio) was changed as anode active material:anode binder:anode conductor=73.7:13.2:13.1 (10.5+2.6). It is to be noted that the average particle size of the anode active material was about 2.5 μm, the weight average molecular weight (MW) of the polyacrylic acid was about one million, the average particle size of the artificial graphite was about 6 μm, and the average particle size of Denka Black was about 48 nm. It is to be noted that each of the average particle sizes described above was expressed in median size (D50).

Subsequently, the anode mixture was mixed with water so that the concentration of the solid content was 40%, which was then stirred with the use of a planetary centrifugal mixer to obtain anode mixture slurry. Subsequently, the anode mixture slurry was applied uniformly onto both surfaces of the anode current collector (strip-like electrolytic copper foil having a thickness of 15 μm) with the use of a coating apparatus. Thereafter, the applied anode mixture slurry was dried to form the anode active material layer. Lastly, the anode active material layer was compression-molded with the use of a roll pressing machine, which was punched into a pellet like shape (having a diameter of 16 mm).

When preparing the electrolytic solution, the electrolyte salt ($LiPF_6$) was dissolved in a solvent (ethylene carbonate (EC) and diethyl carbonate (DEC)). In this case, a composition of the solvent was set as EC:DEC=50:50 in weight ratio, and a content of the electrolyte salt was set to 1 mol/kg with respect to the solvent.

When assembling the secondary battery, first, the test electrode 51 was contained in an outer package can 52, and the counter electrode 53 was contained in an outer package cup 54. Subsequently, the outer package can 52 and the outer package cup 54 were laminated so that the cathode active material layer was opposed to the anode active material layer with the separator 55 (polyethylene film having a thickness of 23 μm) impregnated with the electrolytic solution in between. Lastly, the outer package can 52 and the outer package cup 54 were swaged with a gasket 56. Thus, the coin-type secondary battery (having a diameter of 20 mm and a height of 1.6 mm) was completed.

Cycle characteristics of these secondary batteries were examined, and results shown in Table 1 were obtained. When examining the cycle characteristics, first, in order to stabilize a battery state, the secondary battery was charged and discharged for 1 cycle, and then the secondary battery was charged and discharged again to measure the discharge capacity thereof. Subsequently, the secondary battery was charged and discharged until the total number of cycles reached 100 cycles to measure the discharge capacity. Lastly, capacity retention rate (%)=(discharge capacity at 100th cycle/discharge capacity at 2nd cycle)×100 was calculated. At the time of charge and discharge for 1st and 2nd cycles, the secondary battery was charged at a constant current of 1.23 mA until the upper voltage reached 4.2 V, was then charged at a constant voltage of 4.2 V until the current reached 0.04 mA, and was then discharged at a constant current of 1.23 mA until the voltage reached a final voltage of 2.5 V. At the time of charge and discharge for 3rd to 100th cycles, the secondary battery was charged at a constant current of 4.4 mA until the upper voltage reached 4.2 V, was then charged at a constant voltage of 4.2 V until the current reached 0.04 mA, and was then discharged at a constant current of 4.4 mA until the voltage reached the final voltage of 2.5 V.

TABLE 1

| | | | Covering portion | | | | C/Si | |
| --- | --- | --- | --- | --- | --- | --- | --- | --- |
| Example | Center portion | Intermediate Portion | Fibrous carbon material | Solution | Mesh structure | Capacity retention rate (%) | Before charge and discharge | After charge and discharge |
| 1-1 | Si/SiO | C | CNT | Sol | Formed | 84.8 | 4.7 | 4 |
| 1-2 | | | | Non-sol | Not formed | 17.7 | 5.4 | 3.7 |
| 1-3 | | | — | — | — | 9.2 | 5.4 | 2.3 |

When the center portion included silicon as a constituent element, in the case (Examples 1-1 and 1-2) where the covering portion including the fibrous carbon materials was provided on the center portion, the capacity retention rate was higher, compared to in the case (Example 1-3) where the covering portion was not provided. Moreover, when the covering portion was provided on the center portion, in the case (Example 1-1) where the sol solution was used for forming the covering portion, the capacity retention rate was remarkably higher, compared to in the case (Example 1-2) where the non-sol solution was used. In particular, in the case where the covering portion was formed with the use of the sol solution, a remarkably-high capacity retention rate was achieved when the fibrous carbon material included —COOH as a surface functional group.

Here, the anode active material layers (in the state after compression molding and before charge and discharge) in Examples 1-1 to 1-3 were observed with the use of SEM, and results shown in FIGS. 7, 21, and 22 were obtained. FIGS. 21 and 22 are SEM photographs of Examples 1-2 and 1-3, respectively. It is to be noted that FIGS. 21 and 22 each also show the anode conductor 108 that is artificial graphite and the anode conductor 109 that is Denka Black, together with the center portion 101.

In Example 1-3 in which the covering portion 102 was not formed, only the anode conductors 108 and 109 are present together with the center portion 101, and the center portion 101 was exposed, as shown in FIG. 22.

On the other hand, in Example 1-2 in which the non-sol solution was used, fibrous carbon materials 107 are present other than the center portion 101 and the anode conductors 108 and 109, as illustrated in FIG. 21. However, the fibrous carbon materials 107 are present away from the center portion 101, and the center portion 101 is not covered with the fibrous carbon materials 107.

In contrast, in Example 1-1 in which the sol solution was used, the center portion 101 is covered with the covering portion 102 (the fibrous carbon materials 104) and the center portion 101 is not exposed, as shown in FIG. 7. In this case, the fibrous carbon materials 104 are closely attached to the center portion 101 while extending in the direction along the surface of the center portion 101, and the fibrous carbon materials 104 form the mesh structure, as described above.

It is clear from comparison between FIGS. 7, 21, and 22 that the mesh structure is specifically formed of the fibrous carbon materials 104 in the case of using the sol solution.

In detail, comparing FIG. 21 to FIG. 22, three-dimensional shapes of the surfaces of the center portions 101 are common, and the fibrous carbon materials 107 having an elongated three-dimensional shape are present separately from the center portion 101 (mainly, in gaps between the center portions 101). It is clear from this state that it is not possible to cover the surface of the center portion 101 with the fibrous carbon materials 107 in the case of using the non-sol solution. Moreover, comparing FIG. 7 to FIG. 21, the three-dimensional shapes of the surfaces of the center portions 101 are clearly different. Also, few fibrous carbon materials 104 are present in the gap between the center portions 101, and the outline of the elongated fibrous carbon materials 104 is concentrated on the surface of the center portion 101. It is clear from this state that it is possible to cover the surface of the center portion 101 with the fibrous carbon materials 104 in the case of using the sol solution. As described above, whether or not the mesh structure is allowed to be formed in the case where the fibrous carbon materials 104 and 107 are used depends on whether or not the sol solution is used. More specifically, it may be considered that whether or not the mesh structure is allowed to be formed in the case where the fibrous carbon materials 104 and 107 are used derives from a difference in dispersion characteristics between the fibrous carbon materials 104 and 107.

It is to be noted that, in order to search the cause for the difference in capacity retention rate, elemental mapping was performed on the surfaces of the anode active material layers in Examples 1-1 to 1-3 with the use of a scanning electron microscope (SEM-EDX), and results shown in Table 1 were obtained thereby. In the elemental mapping, an atomic ratio C/Si was measured before and after charging and discharging the secondary battery in order to examine cycle characteristics.

In all of Examples 1-1 to 1-3, the atomic ratio C/Si was decreased after the charge and discharge compared to that before the charge and discharge. It can be considered that this is because a new surface was derived from a crack in the anode active material at the time of charge and discharge, and the atom detection amount of silicon was increased relatively to the atom detection amount of carbon. However, the decrease rate of the atomic ratio C/Si was about 14.9% in Example 1-1, was about 31.5% in Example 1-2, and was about 57.4% in Example 1-3. The decrease rate of the atomic ration C/Si was much smaller in Example 1-1 than in Examples 1-2 and 1-3. This result shows that, when the center portion 101 is covered with the mesh-like covering portion 102, the anode active material is made less likely to crack at the time of charge and discharge, and a new surface is therefore made less likely to be caused in the center portion 101.

Examples 2-1 to 2-6

Coin-type lithium ion secondary batteries were fabricated by the following procedure.

When fabricating the counter electrode 53, first, 91 parts by mass of the cathode active material (LiCoO$_2$), 6 parts by mass of the cathode conductor (carbon black), and 3 parts by mass of the cathode binder (PVDF) were mixed to obtain a cathode mixture. Subsequently, the cathode mixture was dispersed in an organic solvent (NMP) to obtain paste cathode mixture slurry. Subsequently, the cathode mixture slurry was applied onto both surfaces of a cathode current collector (strip-like aluminum foil having a thickness of 20 µm) with the use of a coating apparatus. Thereafter, the applied cathode mixture slurry was dried to form the cathode active material layer. Lastly, the cathode active material layer was compression-molded with the use of a roll pressing machine, and the resultant was punched into a pellet-like shape (having a diameter of 15 mm). In this case, volume density of the cathode active material layer was set to 3.5 g/cm$^3$. Also, weight per unit area of the cathode active material was adjusted so that a lithium extraction capacity per unit area of the test electrode 51 was 90% with respect to the lithium insertion capacity per unit area of the counter electrode 53.

When fabricating the test electrode 51, first, 73.5 parts by mass of the center portion 101 (silicon monoxide), 15 parts by mass of the anode conductor (plate-like natural graphite), 10 parts by mass of the anode binder (polyacrylic acid), and 1.5 parts by mass (converted into weight of the fibrous carbon materials) of the sol solution in which the fibrous carbon materials 104 (CNT) were dispersed were mixed to obtain an anode mixture. The median system (D50: µm) of the center portion 101 was as shown in Table 2. In this case, an anode mixture that included no sol solution was prepared for comparison.

A procedure for preparing the sol solution was as follows.

First, the fibrous carbon materials (CNT subjected to a graphitization process), a solvent for dispersion, and a dispersant were prepared. As CNT, NT7K (having an average fiber diameter of 70 nm) available from Hodogaya Chemical Co., Ltd., CT-12 (having an average fiber diameter of 105 nm) available from Hodogaya Chemical Co., Ltd., VGCF (having an average fiber diameter of 150 nm) available from Showa Denko K. K., or Denka Black available from Denki Kagaku Kogyo Kabushiki Kaisha was used. As the solvent for dispersion, water or N-methyl pyrrolidone was used. As the dispersant, carboxymethyl cellulose sodium (available from Wako Pure Chemical Industries, Ltd.) or polyvinyl pyrrolidone (K30 available from Wako Pure Chemical Industries, Ltd.) was used. As an apparatus for dispersion, a bead mill (LMZ2 available from Ashizawa Finetech Ltd.) was used. As dispersion conditions, a bead size was set to 0.8 mm, and peripheral speed was set to 10 m/sec. In the case of performing the dispersion process, while the solution of the dispersant was circulated, CNT was added to the solution little by little, and the dispersion process was further continued for two hours after the concentration of CNT reached 5 wt %.

It is to be noted that, as the fibrous carbon materials, CNT (MDCNF available from MD Nanotech Corporation) not subjected to a graphitization process was also used. In this case, water was used as a dispersion medium, and carboxymethyl cellulose (available from Junsei Chemical Co., Ltd.) was used as the dispersant. Also, the dispersion process was performed with the use of a ultrasonic homogenizer (available from Hielscher Ultrasonics gmbh) to obtain sol solution (5 wt %).

A cutting process was performed on the fibrous carbon materials on an as-necessary basis.

Specifically, the fibrous carbon materials were subjected to a cutting process with the use of a planetary ball mill (P-5 available from Fritsch Japan Co., Ltd) as a cutting apparatus. In detail, 10 g of the fibrous carbon materials (CNT mentioned above), 10 g of a pulverization aid (ethanol), and 550 g of zirconia ball (having a diameter of 2 mm) were put inside a container made of zirconia (having an inner volume of 500 $cm^3$), which was then subjected to a pulverization process (at 400 rpm for 30 minutes). It is to be noted that an alumina ball (having a diameter of 4 mm) was also used on an as-necessary basis. Subsequently, the pulverized fibrous carbon materials were dried in vacuum to remove residual ethanol. Subsequently, a dispersion process was performed on the pulverized fibrous carbon materials, the solvent (water) for dispersion, and the dispersant (carboxymethyl cellulose sodium available from Wako Pure Chemical Industries, Ltd.) to obtain the sol solution (5 wt %).

Alternatively, 30 g of the fibrous carbon materials (CNT mentioned above), 10 g of fructose, and 500 $cm^3$ of water (at 100 deg C.) were mixed to obtain slurry. Subsequently, the water was evaporated, and the residual material was dried in vacuum (at 120 deg C.) to obtain the fibrous carbon materials covered with fructose. Subsequently, 30 g of the covered fibrous carbon materials and 150 g of zirconia ball (having a diameter of 10 mm) were put inside a container made of zirconia (having an inner volume of 500 $cm^3$), which was subjected to a pulverization process (for 400 rpm for 5 hours). Subsequently, the covered fibrous carbon materials after being pulverized were washed with water to remove the residual fructose, and then the covered fibrous carbon materials were dried in vacuum. Subsequently, a dispersion process was performed on the covered fibrous carbon materials, the solvent (water) for dispersion, and the dispersant (carboxymethyl cellulose sodium available from Wako Pure Chemical Industries, Ltd.) with the use of a ultrasonic homogenizer (available from Hielscher Ultrasonics gmbh) to obtain sol solution (5 wt %).

The configuration (the short fiber rate (%) and the average fiber diameter (nm)) and the physical characteristics (G/D ratio) of the fibrous carbon materials after forming the covering portion 102 were as shown in Table 2. Here, the short fiber rate was changed by changing conditions such as a dispersion method (a planetary ball mill or a ultrasonic homogenizer), a kind of the ball (a material and a size thereof), dispersion time, and whether or not the cutting process was performed. In this case, graphite crystal was broken in the fibrous carbon materials, and the G/D ratio was therefore varied. The G/D ratio is adjustable depending on the type of the ball used for planetary ball mill, whether or not the embedding process using saccharide is performed, etc. Accordingly, it is possible to obtain the fibrous carbon materials having short fiber rates that are about the same but having different G/D ratios.

Subsequently, the anode mixture was dispersed into the solvent (water) to obtain paste anode mixture slurry. Subsequently, the anode mixture slurry was applied onto both surfaces of the anode current collector (strip-like electrolytic copper foil having a thickness of 15 μm) with the use of a coating apparatus. Thereafter, the applied anode mixture slurry was heated. Thus, the covering portion 102 including the fibrous carbon materials 104 was formed on the surface of the center portion 101, and the anode active material layer including the anode active material was formed. Subsequently, the anode active material layer was compression-molded with the use of a flat plate pressing machine, and then was punched into a pellet-like shape (having a diameter of 16 mm). In this case, volume density of the anode active material layer was set to 1.8 $g/cm^3$. Lastly, the anode active material layer was dried in vacuum to remove the residual water included in the anode active material layer.

When preparing the electrolytic solution, the electrolyte salt ($LiPF_6$) was dissolved in a solvent (ethylene carbonate (EC), 4-fluoro-1,3-dioxolane-2-one (FEC), 4,5-difluoro-1,3-dioxolane-2-one (DFEC), and dimethyl carbonate (DMC)). In this case, a composition of the solvent was set as EC:FEC:DFEC:DMC=25:25:25:25 in weight ratio, and a content of the electrolyte salt was set to 1 $mol/dm^3$ (=1 mol/l) with respect to the solvent.

When assembling the secondary battery, first, the test electrode 51 was contained in the outer package can 52, and the counter electrode 53 was contained in the outer package cup 54. Subsequently, the outer package can 52 and the outer package cup 54 were laminated so that the cathode active material layer was opposed to the anode active material layer with the separator 55 (polyethylene film having a thickness of 23 μm) impregnated with the electrolytic solution in between. Lastly, the outer package can 52 and the outer package cup 54 were swaged with the gasket 56. Thus, the coin-type secondary battery (having a diameter of 20 mm and a height of 2.5 mm) was completed.

Initial charge and discharge characteristics and cycle characteristics of these secondary batteries were examined, and results shown in Table 2 were obtained.

When examining the initial charge and discharge characteristics, first, in order to stabilize a battery state, the secondary battery was charged and discharged for 1 cycle. Subsequently, the secondary battery was charged again to measure the charge capacity thereof. Subsequently, the secondary battery was discharged to measure the discharge capacity. Lastly, initial efficiency (%)=(discharge capacity at 2nd cycle/charge capacity at 2nd cycle)×100 was calculated. At the time of charge, the secondary battery was charged at a constant current of 0.5 C until the voltage reached 4.2 V, and was then charged at a constant voltage of 4.2 V until the current reached 0.05 C. At the time of discharge, the secondary battery was charge at a constant current of 0.5 C until the voltage reached 3 V. It is to be noted that 0.5 C is a value of a current by which a battery capacity (theoretical capacity) is completely discharged in two hours, and 0.05 C is a value of a current by which a battery capacity is completely discharged in twenty hours.

When examining the cycle characteristics, first, the secondary battery was charged and discharged for 2 cycles to measure the discharge capacity as in the case of examining the initial charge and discharge characteristics. Subsequently, the secondary battery was charged and discharged until the total number of cycles reached 100 cycles to measure the discharge capacity. Lastly, capacity retention rate (%)=(discharge capacity at 100th cycle/discharge capacity at 2nd cycle)×100 was calculated. Charge and discharge conditions were set to be similar to those in the case of examining the initial charge and discharge characteristics.

TABLE 2

Center portion: SiO, Covering portion: CNT, Sol solution, Mesh structure formed

| Example | Covering portion | Short fiber rate (%) | Average fiber diameter (nm) | G/D ratio | D50 (μm) | Initial efficiency (%) | Capacity retention rate (%) |
|---|---|---|---|---|---|---|---|
| 2-1 | Formed | 94 | 59 | 1.8 | 5.8 | 59.8 | 76 |
| 2-2 |  | 93 | 62 | 2.5 |  | 59 | 72 |
| 2-3 |  | 92 | 60 | 3.3 |  | 59.4 | 68 |
| 2-4 |  | 85 | 63 | 5.4 |  | 59.5 | 66 |
| 2-5 |  | 83 | 65 | 12.8 |  | 57.6 | 66 |
| 2-6 | Not formed | — | — | — | 5.8 | 53.3 | 64 |

In the case (Examples 2-1 to 2-5) in which the covering portion 102 was formed, high initial efficiency and high capacity retention rate were achieved irrespective of the short fiber rate. In this case, the initial efficiency and the capacity retention rate were higher than those in other cases when the short fiber rate was 85% or higher, in particular.

Examples 3-1 to 3-3

As shown in Table 3, the secondary batteries were fabricated and initial charge and discharge characteristics and cycle characteristics were examined by a procedure similar to the procedure in Example 2-3 except that the average fiber diameter was changed. When changing the average fiber diameter, conditions such as a dispersion method (a planetary ball mill or a ultrasonic homogenizer), a kind of the ball (a material and a size thereof), dispersion time, and whether or not the cutting process were changed in a process of preparing the sol solution.

TABLE 3

Center portion: SiO, Covering portion: CNT, Sol solution, Mesh structure formed

| Example | Covering portion | Short fiber rate (%) | Average fiber diameter (nm) | G/D ratio | D50 (μm) | Initial efficiency (%) | Capacity retention rate (%) |
|---|---|---|---|---|---|---|---|
| 3-1 | Formed | 92 | 151 | 4.9 | 5.8 | 57.4 | 66 |
| 3-2 |  | 93 | 102 | 5.9 |  | 58.5 | 67 |
| 2-3 |  | 92 | 60 | 3.3 |  | 59.4 | 68 |
| 3-3 |  | 100 | 15 | 0.9 |  | 63.3 | 67 |
| 2-6 | Not formed | — | — | — | 5.8 | 53.3 | 64 |

In the case (Examples 3-1 to 3-3) in which the covering portion 102 was formed, high initial efficiency and high capacity retention rate were achieved irrespective of the average fiber diameter. In this case, the initial efficiency and the capacity retention rate were higher than those in other cases when the average fiber diameter was 102 nm or smaller, in particular.

Examples 4-1 to 4-4

As shown in Table 4, secondary batteries were fabricated by a procedure similar to the procedure in Example 2-3 and initial charge and discharge characteristics and cycle characteristics were examined except that the G/D ratio was changed. When changing the G/D ratio, conditions such as a dispersion method (a planetary ball mill or a ultrasonic homogenizer), a kind of the ball (a material and a size thereof), dispersion time, and whether or not the cutting process was performed were changed in a process of adjusting the sol solution.

TABLE 4

Center portion: SiO, Covering portion: CNT, Sol solution, Mesh structure formed

| Example | Covering portion | Short fiber rate (%) | Average fiber diameter (nm) | G/D ratio | D50 (μm) | Initial efficiency (%) | Capacity retention rate (%) |
|---|---|---|---|---|---|---|---|
| 4-1 | Formed | 93 | 62 | 11.1 | 5.8 | 57.7 | 70 |
| 4-2 |  | 87 | 65 | 10 |  | 59.1 | 66 |
| 2-4 |  | 85 | 63 | 5.4 |  | 59.5 | 66 |
| 2-3 |  | 92 | 60 | 3.3 |  | 59.4 | 68 |
| 2-1 |  | 94 | 59 | 1.8 |  | 59.8 | 76 |
| 4-3 |  | 94 | 59 | 1 |  | 58 | 68 |
| 4-4 |  | 97 | 59 | 0.7 |  | 54 | 65 |
| 2-6 | Not formed | — | — | — | 5.8 | 53.3 | 64 |

In the case (Examples 4-1 to 4-4) in which the covering portion 102 was formed, high initial efficiency and high capacity retention rate were achieved irrespective of the G/D ratio. In this case, the initial efficiency and the capacity retention rate were both increased further when the G/D ratio was 1 or larger, in particular.

Examples 5-1 to 5-4

As shown in Table 5, secondary batteries were fabricated by a procedure similar to the procedure in Example 2-3 and initial charge and discharge characteristics and cycle characteristics were examined except that the median size (D50) of the center portion 101 was changed. When changing D50, the center portion 101 (silicon monoxide) was pulverized with the use of a planetary ball mill.

TABLE 5

Center portion: SiO, Covering portion CNT, Sol solution, Mesh structure formed

| Example | Covering portion | Short fiber rate (%) | Average fiber diameter (nm) | G/D ratio | D50 (μm) | Initial efficiency (%) | Capacity retention rate (%) |
|---|---|---|---|---|---|---|---|
| 5-1 | Formed | 92 | 60 | 3.3 | 10.1 | 56 | 66 |
| 5-2 | | | | | 7.8 | 58.3 | 65 |
| 2-3 | | | | | 5.8 | 59.4 | 68 |
| 5-3 | | | | | 4.3 | 58.1 | 70 |
| 5-4 | | | | | 1.2 | 60.8 | 67 |
| 2-6 | Not formed | — | — | — | 5.8 | 53.3 | 64 |

In the case (Examples 5-1 to 5-4) in which the covering portion 102 was formed, high initial efficiency and high capacity retention rate were achieved irrespective of D50. In this case, the initial efficiency and the capacity retention rate were both higher than those in other cases when D50 was 7.8 μm or smaller, in particular.

Examples 6-1 to 6-7

As shown in Table 6, secondary batteries were fabricated by a procedure similar to the procedure in Examples 2-1 to 2-6 and initial charge and discharge characteristics and cycle characteristics were examined except that the composition of the anode mixture, etc. were changed.

When preparing the anode mixture, 10 parts by mass of the center portion 101 (silicon monoxide), 80 parts by mass of other anode active material (artificial graphite), 2 parts by mass of the anode conductor (plate-like natural graphite), 1 part by mass of other anode conductor (carbon black), 6 parts by mass of the anode binder (PVDF), and 1 part by mass (converted into weight of the fibrous carbon material) of the sol solution in which the fibrous carbon materials 104 (CNT) were dispersed were mixed.

CNT similar to those in Examples 2-1 to 2-5 was used as the fibrous carbon materials, and the fibrous carbon materials were subjected to a cutting process on an as-necessary basis. Further, the sol solution was prepared with the use of a bead mill or a ultrasonic homogenizer. When preparing this sol solution, polyvinyl pyrrolidone (K30 available from Wako Pure Chemical Industries, Ltd.) was used as the dispersant, and N-methyl pyrrolidone was used as the solvent.

TABLE 6

Center portion: SiO, Covering portion: CNT, Sol solution, Mesh structure formed, Other anode active material: Artificial graphite

| Example | Covering portion | Short fiber rate (%) | Average fiber diameter (nm) | G/D ratio | D50 (μm) | Initial efficiency (%) | Capacity retention rate (%) |
|---|---|---|---|---|---|---|---|
| 6-1 | Formed | 100 | 17 | 0.9 | 2 | 83.7 | 86 |
| 6-2 | | 94 | 58 | 1.9 | | 84 | 87 |
| 6-3 | | 93 | 62 | 11.1 | | 85.1 | 84 |
| 6-4 | | 83 | 63 | 13 | | 85.5 | 83 |
| 6-5 | | 92 | 151 | 3.73 | | 84.3 | 85 |
| 6-6 | | 82 | 150 | 13.1 | | 85.4 | 83 |
| 6-7 | Not formed | — | — | — | 2 | 83.5 | 82 |

Results similar to those shown in Tables 2 to 5 were obtained also in the case (Table 6) in which the composition of the anode mixture was changed. Specifically, in the case (Examples 6-1 to 6-6) in which the covering portion 102 was formed, the initial efficiency and the capacity retention rate were both increased, compared to the case (Example 6-7) in which the covering portion 102 was not formed.

As can be seen from the results shown in Tables 1 to 6, etc., superior battery characteristics were achieved when the covering portion was provided on the surface of the center portion including silicon, etc. as constituent elements, and the fibrous carbon materials included in the covering portion were closely attached to the center portion while extending in the direction along the surface of the center portion.

The present technology has been described above referring to some embodiments and Examples. However, the present technology is not limited to the examples described in the embodiments and Examples, and various modifications may be made. For example, the secondary battery of the present technology is similarly applicable to a secondary battery in which a capacity of an anode includes a capacity derived from insertion and extraction of lithium ions and a capacity accompanying precipitation and dissolution of lithium metal, and a battery capacity is represented by the sum of the both capacities. In this case, an anode material that is capable of inserting and extracting lithium ion is used, and a chargeable capacity of the anode material is so set as to be smaller than a discharge capacity of a cathode.

Moreover, for example, the secondary battery of the present technology is similarly applicable to a case where a secondary battery has another battery structure such as those of a square type and a button type, a case where the battery device has another structure such as a lamination structure, etc.

Moreover, for example, the electrode reactant may be other Group 1 element such as sodium (Na) and potassium (K), Group 2 element such as magnesium and calcium, or other light metal such as aluminum. The effects of the present technology should be achieved irrespective of the kind of the electrode reactant. Similar effects are therefore achieved also when the kind of the electrode reactant is changed.

It is to be noted that the effects described herein are mere examples, and are not limitative. Also, other effects may be provided.

It is to be noted that the present technology may employ the following configurations.

(1)
A secondary battery, including:
a cathode;
an anode including an active material; and
non-aqueous electrolytic solution,
the active material including a center portion and a covering portion provided on part or all of the center portion,
the center portion including silicon (Si), tin (Sn), or both as constituent elements,
the covering portion including a plurality of fibrous carbon materials, and
part or all of the fibrous carbon materials extending in a direction along a surface of the center portion and being closely attached to the center portion.

(2)
The secondary battery according to (1), wherein part or all of the fibrous carbon materials are tangled with one another.

(3)
The secondary battery according to (1) or (2), wherein the covering portion includes a mesh structure that is formed of part or all of the fibrous carbon materials.

(4)
The secondary battery according to any one of (1) to (3), wherein
the anode includes a plurality of the active materials, and
part of the fibrous carbon materials are cross-linked to one another between the active materials.

(5)
The secondary battery according to any one of (1) to (4), wherein the fibrous carbon materials include one or more carbon nanotubes, one or more carbon nanofibers, or both.

(6)
The secondary battery according to any one of (1) to (5), wherein 85 percent or higher of the fibrous carbon materials have a fiber length of 4 micrometers or smaller.

(7)
The secondary battery according to any one of (1) to (6), wherein the fibrous carbon materials have an average fiber diameter of 102 nanometers or smaller.

(8)
The secondary battery according to any one of (1) to (7), wherein a ratio of area of G-band peak to area of D-band peak (the area of the G-band peak/the area of the D-band peak) is 1 or higher in Raman spectrum of the fibrous carbon materials that is measured by Raman spectroscopy.

(9)
The secondary battery according to 1 any one of (1) to (8), wherein
the anode includes a plurality of the active materials, and the center portion has a median system (D50) of 7.8 micrometers or smaller.

(10)

The secondary battery according to any one of (1) to (9), wherein part or all of the fibrous carbon materials each have a carboxyl group (—COOH) on a surface thereof.

(11)

The secondary battery according to any one of (1) to (10), wherein a peak derived from a 1s orbit (O1s) of oxygen (O) is detected as a result of element analysis of the fibrous carbon materials by X-ray photoelectron spectroscopy (XPS).

(12)

The secondary battery according to any one of (1) to (11), wherein the center portion includes one or more of a simple substance of silicon, alloy of silicon, a compound of silicon, a simple substance of tin, alloy of tin, and a compound of tin.

(13)

The secondary battery according to any one of (1) to (12), wherein the active material includes an intermediate portion provided on part or all of the center portion, the intermediate portion including carbon (C) as a constituent element, and the covering portion is provided on the center portion with the intermediate portion in between.

(14)

The secondary battery according to any one of (1) to (13), wherein the anode includes another active material including carbon as a constituent element.

(15)

The secondary battery according to any one of (1) to (14), wherein the secondary battery is a lithium ion secondary battery.

(16)

An electrode, including an active material including a center portion and a covering portion provided on part or all of the center portion, the center portion including silicon (Si), tin (Sn), or both as constituent elements, the covering portion including a plurality of fibrous carbon materials, and part or all of the fibrous carbon materials extending in a direction along a surface of the center portion and being closely attached to the center portion.

(17)

An active material, including:

a center portion; and a covering portion provided on part or all of the center portion, the center portion including silicon (Si), tin (Sn), or both as constituent elements, the covering portion including a plurality of fibrous carbon materials, and part or all of the fibrous carbon materials extending in a direction along a surface of the center portion and being closely attached to the center portion.

(18)

A method of manufacturing an active material, the method including bringing sol solution that includes a plurality of fibrous carbon materials into contact with part or all of a center portion, then heating the sol solution, and thereby forming a covering portion including the fibrous carbon materials, the center portion including silicon (Si), tin (Sn), or both as constituent elements.

(19)

A battery pack, including:

the secondary battery according to any one of (1) to (15);

a control section configured to control operation of the secondary battery; and a switch section configured to switch the operation of the secondary battery according to an instruction of the control section.

(20)

An electric vehicle, including:

the secondary battery according to any one of (1) to (15);

a conversion section configured to convert electric power supplied from the secondary battery into drive power;

a drive section configured to operate according to the drive power; and a control section configured to control operation of the secondary battery.

(21)

An electric power storage system, including:

the secondary battery according to any one of (1) to (15);

one or more electric devices configured to be supplied with electric power from the secondary battery; and a control section configured to control the supplying of the electric power from the secondary battery to the one or more electric devices.

(22)

An electric power tool, including:

the secondary battery according to any one of (1) to (15); and a movable section configured to be supplied with electric power from the secondary battery.

(23)

An electronic apparatus, including the secondary battery according to any one of (1) to (15) as an electric power supply source.

This application claims priority of Japanese Patent Application JP 2012-222774 filed Oct. 5, 2012 in Japan Patent Office, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A secondary battery, comprising:
a cathode;
an anode including an active material; and
a non-aqueous electrolytic solution,
wherein:
the active material including a center portion, and a covering portion provided on a first part of the center portion,
the center portion including at least one of silicon (Si) or tin (Sn) as constituent elements,
the covering portion including a plurality of fibrous carbon materials,
an entire length of each fibrous carbon material of a first set of the plurality of fibrous carbon materials extends in a direction along a surface of the center portion,
the entire length of the each fibrous carbon material of the first set of the plurality of fibrous carbon materials includes a first end portion, a middle portion and a second end portion, the entire length of the each fibrous carbon material of the first set of the plurality of fibrous carbon materials is attached to the center portion, and a second set of the plurality of fibrous carbon materials is tangled with one another.

2. The secondary battery according to claim 1, wherein the covering portion includes a mesh structure that comprises the second set of the plurality of fibrous carbon materials.

3. The secondary battery according to claim 1, wherein the anode includes a plurality of the active materials, and a third set of the plurality of fibrous carbon materials is in the plurality of the active materials, wherein fibrous carbon materials of the third set of the plurality of fibrous carbon materials are cross-linked with each other.

4. The secondary battery according to claim 1, wherein the plurality of fibrous carbon materials comprises at least one of carbon nanotubes or carbon nanofibers.

5. The secondary battery according to claim 1, wherein 85 percent or higher of the plurality of fibrous carbon materials have a fiber length equal to or smaller than 4 micrometers.

6. The secondary battery according to claim 1, wherein the plurality of fibrous carbon materials has an average fiber diameter equal to or smaller than 102 nanometers.

7. The secondary battery according to claim 1, wherein a ratio of an area of a G-band peak to an area of a D-band peak (the area of the G-band peak/the area of the D-band peak) is equal to or greater than 1 in Raman spectrum of the plurality of fibrous carbon materials that is measured by Raman spectroscopy.

8. The secondary battery according to claim 1, wherein the anode includes a plurality of the active materials, and wherein the center portion has a median size (D50) equal to or smaller than 7.8 micrometers.

9. The secondary battery according to claim 1, wherein each fibrous carbon material of the plurality of fibrous carbon materials has a carboxyl group (—COOH) on a surface thereof.

10. The secondary battery according to claim 1, wherein a peak derived from a 1s orbit of oxygen (O) is detected as a result of element analysis of the plurality of fibrous carbon materials by X-ray photoelectron spectroscopy (XPS).

11. The secondary battery according to claim 1, wherein the center portion comprises at least one of silicon, an alloy of silicon, a compound of silicon, tin, an alloy of tin, or a compound of tin.

12. The secondary battery according to claim 1, wherein the active material includes an intermediate portion provided on the first part of the center portion, the intermediate portion including carbon (C) as a constituent element, and wherein the covering portion is provided on the center portion with the intermediate portion in between.

13. The secondary battery according to claim 1, wherein the active material includes carbon as a constituent element.

14. The secondary battery according to claim 1, wherein the secondary battery is a lithium ion secondary battery.

15. The secondary battery according to claim 1, wherein the center portion comprises at least one of a single granular body, and wherein an atomic ratio of oxygen to silicon is from 0.5 to 1.8.

16. The secondary battery according to claim 12, wherein an electric resistance of the intermediate portion is lower than an electric resistance of the center portion.

* * * * *